(12) United States Patent
Linhardt et al.

(10) Patent No.: US 8,083,348 B2
(45) Date of Patent: Dec. 27, 2011

(54) BIOMEDICAL DEVICES

(75) Inventors: Jeffrey G. Linhardt, Fairport, NY (US); Jay F. Kunzler, Canandaigua, NY (US); Devon A. Shipp, Postdam, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 256 days.

(21) Appl. No.: 12/456,420

(22) Filed: Jun. 16, 2009

(65) Prior Publication Data
US 2010/0317816 A1 Dec. 16, 2010

(51) Int. Cl.
*G02C 7/04* (2006.01)
*C08F 28/04* (2006.01)

(52) U.S. Cl. ............... 351/160 H; 351/159; 351/160 R; 526/286

(58) Field of Classification Search .................. 526/286; 351/159, 160 R, 160 H
See application file for complete search history.

(56) References Cited

U.S. PATENT DOCUMENTS

| | | |
|---|---|---|
| 3,408,429 A | 10/1968 | Wichterle |
| 3,660,545 A | 5/1972 | Wichterle |
| 4,113,224 A | 9/1978 | Clark et al. |
| 4,136,250 A | 1/1979 | Mueller et al. |
| 4,153,641 A | 5/1979 | Deichert et al. |
| 4,197,266 A | 4/1980 | Clark et al. |
| 4,327,203 A | 4/1982 | Deichert et al. |
| 4,355,147 A | 10/1982 | Deichert et al. |
| 4,555,732 A | 11/1985 | Tuhro |
| 4,740,533 A | 4/1988 | Su et al. |
| 4,910,277 A | 3/1990 | Bambury et al. |
| 4,954,587 A | 9/1990 | Mueller |
| 5,010,141 A | 4/1991 | Mueller |
| 5,034,461 A | 7/1991 | Lai et al. |
| 5,070,215 A | 12/1991 | Bambury et al. |
| 5,079,319 A | 1/1992 | Mueller |
| 5,260,000 A | 11/1993 | Wandu et al. |
| 5,270,418 A | 12/1993 | Kunzler et al. |
| 5,271,875 A | 12/1993 | Appleton et al. |
| 5,310,779 A | 5/1994 | Lai |
| 5,321,108 A | 6/1994 | Kunzler et al. |
| 5,358,995 A | 10/1994 | Lai et al. |
| 5,387,662 A | 2/1995 | Kunzler et al. |
| 6,440,571 B1 | 8/2002 | Valint, Jr. et al. |
| 6,902,812 B2 | 6/2005 | Valint, Jr. et al. |
| 2001/0024697 A1* | 9/2001 | Baron et al. ................ 427/487 |
| 2006/0287455 A1* | 12/2006 | Salamone et al. ............ 526/279 |
| 2007/0142551 A1* | 6/2007 | Kunzler et al. .............. 525/100 |
| 2007/0197733 A1* | 8/2007 | Salamone et al. ............ 525/242 |
| 2007/0255014 A1* | 11/2007 | Salamone et al. ............ 525/477 |
| 2008/0269418 A1* | 10/2008 | Schlueter et al. ............ 525/185 |
| 2009/0142508 A1 | 6/2009 | Lai et al. |

FOREIGN PATENT DOCUMENTS

| | | |
|---|---|---|
| WO | WO 96/31792 | 10/1996 |
| WO | WO2008/124093 | 10/2008 |
| WO | WO2010/135481 | 11/2010 |

OTHER PUBLICATIONS

Polysciences Inc Technical Data Sheet 509 (Apr. 2008).*
Lai, Yu-Chin, "The Role of Bulky Polysiloxanylalkyl Methacrylates in Polyurethane-Polysiloxane Hydrogels," Journal of Applied Polymer Science, vol. 60, 1193-1199 (1996).
Karunakaran et al., "Synthesis, Characterization, and Crosslinking of Methacrylate-Telechelic PDMAAm-b-PDMS-b-PDMAAm Copolymers", Journal of Polymer Science: Part A: Polymer Chemistry, vol. 45, pp. 4284-4290 (2007).
Xia, J. *Chem. Rev.*, 101, 2921-2990 (2001).
International Search Report (PCT/ISA/210) and Written Opinion (PCT/ISA/237) mailed on Feb. 16, 2011.
Gao, H et al. "Synthesis of functional polymers with controlled architecture . . . " in Progress in Polymer Sci., Apr. 1, 2009, vol. 34, No. 4, pp. 317-350.
Karunakaran, R et al. "Synthesis, characterization, and crosslinking of methacrylate-telechelic..polymers" in J of Polym Sci, Part A, vol. 45, No. 8, pp. 4284-4290, Sep. 15, 2007.

* cited by examiner

*Primary Examiner* — David W Wu
*Assistant Examiner* — Vu A Nguyen
(74) *Attorney, Agent, or Firm* — Glenn D. Smith; M. Carmen & Associates, LLC

(57) ABSTRACT

Biomedical devices such as contact lenses formed from a polymerization product of a mixture comprising an ethylenically unsaturated-containing non-amphiphilic macromonomer comprising hydrophilic units or hydrophobic units derived from a living radical polymerization of one or more ethylenically unsaturated hydrophilic monomers or one or more ethylenically unsaturated hydrophobic monomers are disclosed.

20 Claims, No Drawings

BIOMEDICAL DEVICES

BACKGROUND OF THE INVENTION

1. Technical Field

The present invention generally relates to biomedical devices such as ophthalmic lenses.

2. Description of Related Art

Biomedical devices such as contact lenses are made of various polymeric materials, including rigid gas permeable materials, soft elastomeric materials, and soft hydrogel materials. The majority of contact lenses sold today are made of soft hydrogel materials. Hydrogels are a cross-linked polymeric system that absorb and retain water, typically 10 to 80 percent by weight, and especially 20 to 70 percent water. Hydrogel lenses are commonly prepared by polymerizing a lens-forming monomer mixture including at least one hydrophilic monomer, such as 2-hydroxyethyl methacrylate, N,N-dimethylacrylamide, N-vinyl-2-pyrrolidone, glycerol methacrylate, and methacrylic acid. In the case of silicone hydrogel lenses, a silicone-containing monomer is copolymerized with the hydrophilic monomers. Regardless of their water content, both hydrogel and non-hydrogel siloxy and/or fluorinated contact lenses tend to have relatively hydrophobic, non-wettable surfaces.

In the field of biomedical devices such as contact lenses, various physical and chemical properties such as, for example, oxygen permeability, wettability, material strength and stability are but a few of the factors that must be carefully balanced in order to provide a useable contact lens. For example, since the cornea receives its oxygen supply from contact with the atmosphere, good oxygen permeability is an important characteristic for certain contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

It is known that increasing the hydrophilicity of a contact lens surface improves the wettability of the contact lenses. This, in turn, is associated with improved wear comfort of the lens. Additionally, the surface of the lens can affect the overall susceptibility of the lens to deposition of proteins and lipids from the tear fluid during lens wear. Accumulated deposits can cause eye discomfort or even inflammation. In the case of extended wear lenses, i.e., a lens used without daily removal before sleep, the surface is especially important, since extended wear lenses must be designed for high standards of comfort and biocompatibility over an extended period of time. Accordingly, new formulations that have the potential to yield improved surface qualities are still desirable.

Karunakaran et al., "Synthesis, Characterization, and Crosslinking of Methacrylate-Telechelic PDMAAm-b-PDMS-b-PDMAAm Copolymers", Journal of Polymer Science: Part A: Polymer Chemistry, Vol. 45, pp. 4284-4290 (2007) ("Karunakaran et al.") discloses the preparation of a new amphiphilic methacrylate-telechelic pentablock copolymer by reversible addition fragmentation chain transfer ("RAFT") polymerization. Karunakaran et al. further discloses that the new amphiphilic methacrylate-telechelic pentablock copolymers can be used in an ophthalmic application such as in the formation of a contact lens. However, the process for making the amphiphilic methacrylate-telechelic pentablock copolymers is time consuming and employs different reagents and process conditions. This, in turn, can cause reproducibility problems. In addition, the methacrylate-telechelic copolymers prepared by Karanakaran et al. are cross-linking agents, which can increase the "effective" cross-link density of the resulting product resulting in a higher modulus of the product.

It would therefore be desirable to provide improved biomedical devices such as contact lenses that exhibit suitable physical and chemical properties, e.g., oxygen permeability, lubriciousness and wettability, for prolonged contact with the body while also being biocompatible. It would also be desirable to provide improved biomedical devices that are easy to manufacture in a simple, cost effective manner.

SUMMARY OF THE INVENTION

In accordance with one embodiment of the present invention, a biomedical device is provided comprising a polymerization product of a mixture comprising an ethylenically unsaturated-containing non-amphiphilic macromonomer comprising hydrophilic units or hydrophobic units derived from a living radical polymerization of one or more ethylenically unsaturated hydrophilic monomers or one or more ethylenically unsaturated hydrophobic monomers.

In accordance with a second embodiment of the present invention, a biomedical device is provided comprising a polymerization product of a mixture comprising (a) an ethylenically unsaturated-containing non-amphiphilic macromonomer comprising hydrophilic units or hydrophobic units derived from a living radical polymerization of one or more ethylenically unsaturated hydrophilic monomers or one or more ethylenically unsaturated hydrophobic monomers; and (b) a biomedical device-forming monomer.

The biomedical devices of the present invention are advantageously formed from an ethylenically unsaturated-containing non-amphiphilic macromonomer comprising hydrophilic units or hydrophobic units derived from a living radical polymerization of one or more ethylenically unsaturated hydrophilic monomers or one or more ethylenically unsaturated hydrophobic monomers. The ethylenically unsaturated-containing non-amphiphilic macromonomers are made utilizing controlled radical polymerizations. Controlled radical polymerization allows the synthesis of polymers with well-defined molecular architecture with low polydispersity.

DETAILED DESCRIPTION OF THE PREFERRED EMBODIMENTS

The present invention is directed to biomedical devices intended for direct contact with body tissue or body fluid. As used herein, a "biomedical device" is any article that is designed to be used while either in or on mammalian tissues or fluid, and preferably in or on human tissue or fluids. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses. The preferred biomedical devices are ophthalmic devices, particularly contact lenses, and most particularly contact lenses made from hydrogels.

As used herein, the term "ophthalmic device" refers to devices that reside in or on the eye. These devices can provide optical correction, wound care, drug delivery, diagnostic functionality or cosmetic enhancement or effect or a combination of these properties. Useful ophthalmic devices include, but are not limited to, ophthalmic lenses such as soft contact lenses, e.g., a soft, hydrogel lens, soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking.

The biomedical devices of the present invention are formed from a polymerization product of a mixture comprising an ethylenically unsaturated-containing non-amphiphilic macromonomer comprising hydrophilic units or hydrophobic units derived from a living radical polymerization of an ethylenically unsaturated hydrophilic monomer or an ethylenically unsaturated hydrophobic monomer. The ethylenically unsaturated-containing non-amphiphilic macromonomers are prepared via controlled radical polymerization, i.e., the macromonomers are polymerized via a reversible addition-fragmentation chain transfer polymerization ("RAFT") mechanism or an Atom Transfer Radical Polymerization ("ATRP") mechanism.

Representative examples of the ethylenically unsaturated moiety of the ethylenically unsaturated-containing non-amphiphilic macromonomer include, by way of example, (meth)acrylate-containing radicals, (meth)acrylamido-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like. As used herein, the term "(meth)" denotes an optional methyl substituent. Thus, for example, terms such as "(meth)acrylate" denotes either methacrylate or acrylate, and "(meth)acrylamide" denotes either methacrylamide or acrylamide.

In one embodiment, an ethylenically unsaturated moiety of the ethylenically unsaturated-containing non-amphiphilic macromonomer is represented by the general formula:

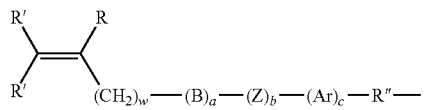

wherein R is hydrogen or a alkyl group having 1 to 6 carbon atoms such as methyl; each R' is independently hydrogen, an alkyl radical having 1 to 6 carbon atoms, or a —CO—Y—R''' radical wherein Y is —O—, —S— or —NH— and R''' is an alkyl radical having 1 to about 10 carbon atoms; R'' is a linking group (e.g., a divalent alkenyl radical having 1 to about 12 carbon atoms); B denotes —O— or —NH—; Z denotes —CO—, —COO— or —COO—; Ar denotes an aromatic radical having 6 to about 30 carbon atoms; w is 0 to 6; a is 0 or 1; b is 0 or 1; and c is 0 or 1. The ethylenically unsaturated-containing moiety can be attached to the macromonomer as pendent groups, terminal groups or both.

In addition to the ethylenically unsaturated moiety, the ethylenically unsaturated-containing non-amphiphilic macromonomers described herein also contain hydrophilic units or hydrophobic units derived from a living radical polymerization of one or more ethylenically unsaturated hydrophilic monomers or one or more ethylenically unsaturated hydrophobic monomers. The term "ethylenically unsaturated polymerizable" as used herein shall be understood to include any of the ethylenically unsaturated moieties discussed herein above.

The hydrophilic units can be derived from the same or different ethylenically unsaturated polymerizable hydrophilic monomer. Suitable ethylenically unsaturated polymerizable hydrophilic monomers to form hydrophilic units in the macromonomer include, by way of example, acrylamides such as N,N-dimethylacrylamide, N,N-dimethylmethacrylamide, and the like; acetamides such as N-vinyl-N-methyl acetamide, N-vinyl acetamide and the like; formamides such as N-vinyl-N-methyl formamide, N-vinyl formamide, and the like; cyclic lactams such as N-vinyl-2-pyrrolidone and the like; (meth)acrylated alcohols such as 2-hydroxyethyl methacrylate, 2-hydroxyethyl acrylate and the like; (meth)acrylated poly(ethyleneglycol)s and the like; ethylenically unsaturated carboxylic acids such as methacrylic acid, acrylic acid and the like and mixtures thereof.

In one embodiment, hydrophilic units can be derived from an ethylenically unsaturated polymerizable hydrophilic monomer having ring-opening reactive functionalities. Such monomers may include one or more ring-opening reactive groups such as, for example, azlactone, epoxy, acid anhydrides, and the like. Suitable ethylenically unsaturated polymerizable hydrophilic monomers having ring-opening reactive functionalities include, but are not limited to, glycidyl methacrylate, glycidyl acrylate, glycidyl vinylcarbonate, glycidyl vinylcarbamate, vinylcyclohexyl-1,2-epoxide, maleic anhydride, itaconic anhydride and the like and mixtures thereof. The unit derived from the ethylenically unsaturated polymerizable hydrophilic monomers having ring-opening reactive functionalities can be copolymerized with a hydrophilic comonomer to form hydrophilic units in the resulting ethylenically unsaturated-containing non-amphiphilic macromonomer. Non-limiting examples of hydrophilic comonomers useful to be copolymerized with the ring-opening reactive functionalities of the hydrophilic monomer include those mentioned above, with dimethylacrylamide, hydroxyethyl methacrylate (HEMA), and/or N-vinylpyrrolidone being preferred. Alternatively, the units derived from the ethylenically unsaturated polymerizable hydrophilic monomers having ring-opening reactive functionalities can be subjected to a ring-opening reaction, e.g., by hydrolyzing with water, and form hydrophilic units in the resulting ethylenically unsaturated-containing non-amphiphilic macromonomers.

In one embodiment, hydrophilic units are derived from an ethylenically unsaturated protected monomer such as, for example, nitrogen protected monomers, acetate protected monomers, e.g., vinyl acetate, and the like. In general, nitrogen protected monomers ("NPM") have an amino group that is protected by a nitrogen protecting group. As used herein, the term "nitrogen protecting group" means a group attached to a nitrogen atom to preclude that nitrogen atom from participating in a polymerization reaction. Although secondary amine groups can be protected in accordance with the invention, in most embodiments the protected amino group provides a primary amine group following deprotection.

Suitable nitrogen protecting groups include, but are not limited to: (a) "carbamate-type" groups of the formula C(O)O—R', wherein R' is an aromatic or aliphatic hydrocarbon group, which may be optionally substituted and which, taken together with the nitrogen atom to which it is attached forms a carbamate group; (b) "amide-type" groups of the formula —C(O)—R'' wherein R'' is for example methyl, phenyl, trifluoromethyl, and the like, which taken together with the nitrogen atom to which they are attached form an amide group; (c) "N-sulfonyl" derivatives, that is groups of the formula —SO₂—R''' wherein R''' is, for example, tolyl, phenyl, trifluoromethyl, 2,2,5,7,8-pentamethylchroman-6-yl-, 2,3,6-trimethyl-4-methoxybenzene, and the like.

Representative examples of nitrogen protecting groups include, but are not limited to, benzyloxycarbonyl (CBZ), p-methoxybenzyloxycarbonyl, p-nitrobenzyloxycarbonyl, tert-butoxycarbonyl (t-BOC), 9-fluorenylmethyloxycarbonyl (Fmoc), 2-chlorobenzyloxycarbonyl, allyloxycarbonyl (alloc), 2-(4-biphenylyl)propyl-2-oxycarbonyl (Bpoc), 1-adamantyloxycarbonyl, trifluoroacetyl, toluene sulphonyl and the like.

In one embodiment, examples of t-Boc protected monomers include 2-(2-(tert-butoxycarbonylamino)acetoxy)ethyl methacrylate, 2-(2-(tert-butoxycarbonylamino)acetamido) ethyl methacrylate, 2-(tert-butoxycarbonylamino)ethyl methacrylate, tert-butyl 2-(vinyloxycarbonyloxy)ethylcarbamate, 2-(tert-butoxycarbonylamino)ethyl-N-vinylcarbamate, 3-(2-(tert-butoxycarbonylamino)acetoxy)-2-hydroxypropyl, N-(tert-Butoxycarbonyl)-L-glutamic acid methacryloxyethyl ester, 2-(tert-butoxycarbonylamino)-6-(3-(2-(methacryloyloxy)ethyl)ureido)hexanoic acid, 2-(tert-butoxycarbonylamino)-3-(methacryloyloxy)propanoic acid, 2-(tert-butoxycarbonylamino)-6-methacrylamidohexanoic acid and the like.

The nitrogen protecting groups present in the units can be readily removed post-polymerization by well known methods in the chemical art to form hydrophilic units. Techniques for protecting amino nitrogen atoms with nitrogen protecting groups, and for deprotecting amino nitrogen atoms after a particular reaction are well known in the chemical art. See, for example, Greene et al., Protective Groups in Organic Synthesis, John Wiley & Sons, 1991, and U.S. Provisional Ser. Nos. 61/113,736; 61/113,739; 61/113,742; and 61/113,746, the contents of which are incorporated by reference herein. By way of example, an NPM can be prepared by reaction of a nitrogen-protected amino acid or amino alcohol with an ethylenically unsaturated compound having a group reactive with the respective acid or an alcohol group. In some embodiments a nitrogen protected amino acid may also have an unprotected amine group or a hydroxyl group, and the second amine group or the hydroxyl group, respectively, is the site of reaction to attach the ethylenic unsaturation. If the nitrogen protected amino acid has multiple available sites of attachment of an ethylenically unsaturated group NPM monomers having two or more ethylenically unsaturated groups may be produced.

As one skilled in the art will readily understand, these monomers are usually hydrophobic in the "protected" or "blocked" form. In order to become more polar and hydrophilic, the protecting group (e.g., in the case of the t-Boc monomers) will need to be removed from the unit. This will result in the biomedical device becoming more hydrophilic in nature and the material could therefore retain more water. Methods for removing the protecting group are within the purview of one skilled in the art.

In another embodiment, hydrophilic units can be derived from an ethylenically unsaturated polymerizable alkoxylated polymer. Suitable ethylenically unsaturated polymerizable alkoxylated polymers include, by way of example, polymerizable polyethylene glycols having a molecular weight of up to, for example, about 1000 such as those with CTFA names PEG-200, PEG-400, PEG-600, PEG-1000, and mixtures thereof. Representative examples include PEG-200 methacrylate, PEG-400 methacrylate, PEG-600 methacrylate, PEG-1000 methacrylate and the like and mixtures thereof.

In one embodiment, examples of hydrophilic units include, but are not limited to, polyoxyalkylenes, polyacrylamides such as polydimethylacrylamide and the like, polyvinylpyrrolidones, polyvinyl alcohols, poly(hydroxyethyl methacrylate) or poly (HEMA) and the like and mixtures thereof.

The hydrophobic units can be derived from the same or different ethylenically unsaturated polymerizable hydrophobic monomer. The term "ethylenically unsaturated polymerizable" as used herein shall be understood to include any of the ethylenically unsaturated moieties discussed herein above.

In one embodiment, hydrophobic units can be derived from an ethylenically unsaturated polymerizable fluorine-containing monomer. Suitable polymerizable fluorine-containing monomers include fluorine substituted hydrocarbons having one or more polymerizable ethylenically unsaturated-containing radicals attached thereto and optionally containing one or more ether linkages, e.g., fluorine substituted straight or branched $C_1$-$C_{18}$ alkyl groups having one or more polymerizable ethylenically unsaturated-containing radicals attached thereto which may include ether linkages therebetween; fluorine substituted $C_3$-$C_{24}$ cycloalkyl groups having one or more polymerizable ethylenically unsaturated-containing radicals attached thereto which may include ether linkages therebetween; fluorine substituted $C_5$-$C_{30}$ aryl groups having one or more polymerizable ethylenically unsaturated-containing radicals attached thereto which may include ether linkages therebetween and the like.

Representative examples of polymerizable fluorine-containing monomers include, but are not limited to, 2,2,2-trifluoroethyl(meth)acrylate, 2,2,3,3-tetrafluoropropyl (meth)acrylate, 2,2,3,3,3-pentafluoropropyl(meth)acrylate, 1-trifluoromethyl-2,2,2-trifluoroethyl(meth)acrylate, 1H,1H, 5H-octafluoropentyl(meth)acrylate, octafluoropentyl methacrylate, octafluoropentyl vinyl carbonate, octafluoropentyl n-vinyl carbamate, hexafluoroisopropyl(meth)acrylate, 2,2, 3,3,4,4-hexafluorobutyl(meth)acrylate, pentafluorophenyl (meth)acrylate, pentafluorohexyl(meth)acrylate and the like and mixtures thereof.

In another embodiment, hydrophobic units can be derived from an ethylenically unsaturated polymerizable ester-containing monomer. Suitable ethylenically unsaturated polymerizable ester-containing monomers include, by way of example, polymerizable fatty acid ester-containing monomers including vinyl esters made from fatty acids having from 4 to about 26 carbon atoms, and preferably from about 12 to about 16 carbon atoms in the chain. Examples of suitable polymerizable fatty acid ester-containing monomers include, but are not limited to, vinyl laurate, vinyl nononoate, vinyl pivalate, vinyl crotanate, allyl crotanate, vinyl stearate and the like and mixtures thereof.

In another embodiment, hydrophobic units can be derived from an ethylenically unsaturated polymerizable polysiloxanylalkyl-containing monomer. Suitable polymerizable polysiloxanylalkyl-containing monomers include, but are not limited to, methacryloxypropyl tris(trimethylsiloxy)silane, 3-(trimethylsilyl)propyl vinyl carbonate; 3-(vinyloxycarbonylthio)propyl-[tris(trimethylsiloxy)silane]; 3-[tris(tri-methylsiloxy)silyl]propyl vinyl carbamate; 3-[tris(trimethylsiloxy)silyl]propyl allyl carbamate; 3-[tris(trimethylsiloxy)silyl]propyl vinyl carbonate, tris(trimethylsiloxy)silylpropyl methacrylamide and the like and mixtures thereof. In one embodiment, the polymerizable polysiloxanylalkyl-containing monomer is M1-MCR-C12 as shown in the formula below:

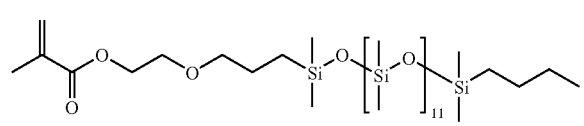

M1-MCR-C12

In one embodiment, hydrophobic units can be derived from an ethylenically unsaturated polymerizable monomer having ring-opening reactive functionalities. Such monomers may include one or more ring-opening reactive groups such as, for example, azlactone, epoxy, acid anhydrides, and the like. Suitable ethylenically unsaturated polymerizable monomers having ring-opening reactive functionalities include, but are not limited to, glycidyl methacrylate, glycidyl acrylate, glycidyl vinylcarbonate, glycidyl vinylcarbamate, 4,4-dimethyl-2-vinyloxazol-5(4H)-one, vinylcyclohexyl-1,2-epoxide, maleic anhydride, itaconic anhydride and the like and mixtures thereof.

In another embodiment, hydrophobic units can be derived from a hydrophobic monomer selected from the group consisting of alkyl(meth)acrylates, N-alkyl (meth)acrylamides, alkyl vinylcarbonates, alkyl vinylcarbamates, fluoroalkyl (meth)acrylates, N-fluoroalkyl(meth)acrylamides, N-fluoroalkyl vinylcarbonates, N-fluoroalkyl vinylcarbamates, silicone-containing (meth)acrylates, (meth)acrylamides, vinyl carbonates, vinyl carbamates, vinyl esters, styrenic monomers, polyoxypropylene (meth)acrylates and the like and combinations thereof. Representative examples of such hydrophobic monomers include methyl(meth)acrylate, ethyl (meth)acrylate, propyl(meth)acrylate, i-propyl (meth)acrylate, n-butyl(meth)acrylate, t-butyl(meth)acrylate, n-hexyl (meth)acrylate, cyclohexyl(meth)acrylate, octyl(meth) acrylate, decyl(meth)acrylate, undecyl(meth)acrylate, dodecyl methacrylate and lauryl(meth)acrylate, octafluoropentyl methacrylate, perfluorooctyl methacrylate, styrene, alpha-methyl styrene, p-methyl styrene, p-t-butyl monochloro styrene, and p-t-butyl dichloro styrene, methacryloyl oxypropyl tris(trimethylsiloxy)silane (TRIS), vinyl acetate, t-butyl allyl carbamate and mixtures thereof.

Representative examples of hydrophobic units include, but are not limited to, polysiloxanes, perfluorinated polyethers, polyfluoroalkyls, polydienes and the like and mixtures thereof.

The hydrophilic or hydrophobic units in the ethylenically unsaturated-containing non-amphiphilic macromonomers are advantageously derived by living radical polymerization or controlled free radical polymerization. The term "controlled" is used herein to describe all polymerization processes from which macromonomers with predetermined molar masses and low polydispersities can be obtained. In one embodiment, living radical polymerization takes place through a thio carbonyl thio reversible addition-fragmentation transfer (RAFT) agent (or RAFT group). In another embodiment, living radical polymerization takes place through an atom transfer radical polymerization (ATRP) group.

In the case where living radical polymerization is by way of RAFT polymerization, the RAFT agent employed in the RAFT polymerization is based upon thio carbonyl thio chemistry which is well known to those of ordinary skill in the art. The thio carbonyl thio fragment can be derived from a monofunctional or difunctional RAFT agent such as, for example, a xanthate-containing compound, trithiocarbonate-containing compound, dithiocarbamate-containing compound or dithio ester-containing compound, wherein each compound contains a thio carbonyl thio group. One class of RAFT agents that can be used herein is of the general formula:

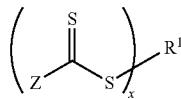

wherein x is 1 or 2, Z is a substituted oxygen (e.g., xanthates ($-O-R^2$)), a substituted nitrogen (e.g., dithiocarbamates ($-NR^2R^3$)), a substituted sulfur (e.g., trithiocarbonates ($-S-R^2$)), a substituted or unsubstituted $C_1$-$C_{20}$ alkyl or $C_3$-$C_{25}$ unsaturated, or partially or fully saturated ring (e.g., dithioesters ($-R^2$)) or a carboxylic acid-containing group; and $R^2$ and $R^3$ are independently a straight or branched, substituted or unsubstituted $C_1$-$C_{30}$ alkyl group, a substituted or unsubstituted $C_3$-$C_{30}$ cycloalkyl group, a substituted or unsubstituted $C_3$-$C_{30}$ cycloalkylalkyl group, a substituted or unsubstituted $C_3$-$C_{30}$ cycloalkenyl group, a substituted or unsubstituted $C_5$-$C_{30}$ aryl group, a substituted or unsubstituted $C_5$-$C_{30}$ arylalkyl group, a $C_1$-$C_{20}$ ester group; an ether or polyether-containing group; an alkyl- or arylamide group; an alkyl- or arylamine group; a substituted or unsubstituted $C_5$-$C_{30}$ heteroaryl group; a substituted or unsubstituted $C_3$-$C_{30}$ heterocyclic ring; a substituted or unsubstituted $C_4$-$C_{30}$ heterocycloalkyl group; a substituted or unsubstituted $C_6$-$C_{30}$ heteroarylalkyl group a carboxylic acid-containing group; and combinations thereof.

Representative examples of alkyl groups for use herein include, by way of example, a straight or branched alkyl chain radical containing carbon and hydrogen atoms of from 1 to about 30 carbon atoms and preferably from 1 to about 12 carbon atoms with or without unsaturation, to the rest of the molecule, e.g., methyl, ethyl, n-propyl, 1-methylethyl (isopropyl), n-butyl, n-pentyl, methylene, ethylene, etc., and the like.

Representative examples of cycloalkyl groups for use herein include, by way Of example, a substituted or unsubstituted non-aromatic mono or multicyclic ring system of about 3 to about 30 carbon atoms and preferably from 3 to about 6 carbon atoms such as, for example, cyclopropyl, cyclobutyl, cyclopentyl, cyclohexyl, perhydronaphthyl, adamantyl and norbornyl groups, bridged cyclic groups or spirobicyclic groups, e.g., spiro-(4,4)-non-2-yl and the like, optionally containing one or more heteroatoms, e.g., O and N, and the like.

Representative examples of cycloalkylalkyl groups for use herein include, by way of example, a substituted or unsubstituted cyclic ring-containing radical containing from about 3 to about 30 carbon atoms and preferably from 3 to about 6 carbon atoms directly attached to the alkyl group which are then attached to the main structure of the monomer at any carbon from the alkyl group that results in the creation of a stable structure such as, for example, cyclopropylmethyl, cyclobutylethyl, cyclopentylethyl and the like, wherein the cyclic ring can optionally contain one or more heteroatoms, e.g., O and N, and the like.

Representative examples of cycloalkenyl groups for use herein include, by way of example, a substituted or unsubstituted cyclic ring-containing radical containing from about 3 to about 30 carbon atoms and preferably from 3 to about 6 carbon atoms with at least one carbon-carbon double bond such as, for example, cyclopropenyl, cyclobutenyl, cyclopentenyl and the like, wherein the cyclic ring can optionally contain one or more heteroatoms, e.g., O and N, and the like.

Representative examples of aryl groups for use herein include, by way of example, a substituted or unsubstituted monoaromatic or polyaromatic radical containing from about 5 to about 30 carbon atoms such as, for example, phenyl, naphthyl, tetrahydronaphthyl, indenyl, biphenyl and the like, optionally containing one or more heteroatoms, e.g., O and N, and the like.

Representative examples of arylalkyl groups for use herein include, by way of example, a substituted or unsubstituted aryl group as defined herein directly bonded to an alkyl group as defined herein, e.g., —$CH_2C_6H_5$, —$C_2H_5C_6H_5$ and the like, wherein the aryl group can optionally contain one or more heteroatoms, e.g., O and N, and the like.

Representative examples of ester groups for use herein include, by way of example, a carboxylic acid ester having one to 20 carbon atoms and the like.

Representative examples of ether or polyether containing groups for use herein include, by way of example, an alkyl ether, cycloalkyl ether, cycloalkylalkyl ether, cycloalkenyl ether, aryl ether, arylalkyl ether wherein the alkyl, cycloalkyl, cycloalkylalkyl, cycloalkenyl, aryl, and arylalkyl groups are as defined herein. Exemplary ether or polyether-containing groups include, by way of example, alkylene oxides, poly(alkylene oxide)s such as ethylene oxide, propylene oxide, butylene oxide, poly(ethylene oxide)s, poly(ethylene glycol)s, poly(propylene oxide)s, poly(butylene oxide)s and mixtures or copolymers thereof, an ether or polyether group of the general formula —$(R^4OR^5)_t$, wherein $R^4$ is a bond, a substituted or unsubstituted alkyl, cycloalkyl or aryl group as defined herein and $R^5$ is a substituted or unsubstituted alkyl, cycloalkyl or aryl group as defined herein and t is at least 1, e.g., —$CH_2CH_2OC_6H_5$ and $CH_2$—$CH_2$—$CH_2$—O—$CH_2$—$(CF_2)_z$—H where z is 1 to 6, —$CH_2CH_2OC_2H_5$, and the like.

Representative examples of alkyl or arylamide groups for use herein include, by way of example, an amide of the general formula —$R^6C(O)NR^7R^8$ wherein $R^6$, $R^7$ and $R^8$ are independently $C_1$-$C_{30}$ hydrocarbons, e.g., $R^6$ can be alkylene groups, arylene groups, cycloalkylene groups and $R^7$ and $R^8$ can be alkyl groups, aryl groups, and cycloalkyl groups as defined herein and the like.

Representative examples of alkyl or arylamine groups for use herein include, by way of example, an amine of the general formula —$R^9NR^{10}R^{11}$ wherein $R^9$ is a $C_2$-$C_{30}$ alkylene, arylene, or cycloalkylene and $R^{10}$ and $R^{11}$ are independently $C_1$-$C_{30}$ hydrocarbons such as, for example, alkyl groups, aryl groups, or cycloalkyl groups as defined herein.

Representative examples of heterocyclic ring groups for use herein include, by way of example, a substituted or unsubstituted stable 3 to about 30 membered ring radical, containing carbon atoms and from one to five heteroatoms, e.g., nitrogen, phosphorus, oxygen, sulfur and mixtures thereof. Suitable heterocyclic ring radicals for use herein may be a monocyclic, bicyclic or tricyclic ring system, which may include fused, bridged or spiro ring systems, and the nitrogen, phosphorus, carbon, oxygen or sulfur atoms in the heterocyclic ring radical may be optionally oxidized to various oxidation states. In addition, the nitrogen atom may be optionally quaternized; and the ring radical may be partially or fully saturated (i.e., heteroaromatic or heteroaryl aromatic). Examples of such heterocyclic ring radicals include, but are not limited to, azetidinyl, acridinyl, benzodioxolyl, benzodioxanyl, benzofuryl, carbazolyl, cinnolinyl, dioxolanyl, indolizinyl, naphthyridinyl, perhydroazepinyl, phenazinyl, phenothiazinyl, phenoxazinyl, phthalazinyl, pyridyl, pteridinyl, purinyl, quinazolinyl, quinoxalinyl, quinolinyl, isoquinolinyl, tetrazoyl, imidazolyl, tetrahydroquinolinyl, tetrahydroisoquinolinyl, piperidinyl, piperazinyl, 2-oxopiperazinyl, 2-oxopiperidinyl, 2-oxopyrrolidinyl, 2-oxoazepinyl, azepinyl, pyrrolyl, 4-piperidonyl, pyrrolidinyl, pyrazinyl, pyrimidinyl, pyridazinyl, oxazolyl, oxazolinyl, oxazolidinyl, triazolyl, indanyl, isoxazolyl, iso-oxazolidinyl, morpholinyl, thiazolyl, thiazolinyl, thiazolidinyl, isothiazolyl, quinuclidinyl, isothiazolidinyl, indolyl, isoindolyl, indolinyl, isoindolinyl, octahydroindolyl, octahydroisoindolyl, quinolyl, isoquinolyl, decahydroisoquinolyl, benzimidazolyl, thiadiazolyl, benzopyranyl, benzothiazolyl, benzooxazolyl, furyl, tetrahydrofurtyl, tetrahydropyranyl, thienyl, benzothienyl, thiamorpholinyl, thiamorpholinyl sulfoxide, thiamorpholinyl sulfone, dioxaphospholanyl, oxadiazolyl, chromanyl, isochromanyl and the like and mixtures thereof.

Representative examples of heteroaryl groups for use herein include, by way of example, a substituted or unsubstituted heterocyclic ring radical as defined herein. The heteroaryl ring radical may be attached to the main structure at any heteroatom or carbon atom that results in the creation of a stable structure.

Representative examples of heteroarylalkyl groups for use herein include, by way of example, a substituted or unsubstituted heteroaryl ring radical as defined herein directly bonded to an alkyl group as defined herein. The heteroarylalkyl radical may be attached to the main structure at any carbon atom from the alkyl group that results in the creation of a stable structure.

Representative examples of heterocyclic groups for use herein include, by way of example, a substituted or unsubstituted heterocyclic ring radical as defined herein. The heterocyclic ring radical may be attached to the main structure at any heteroatom or carbon atom that results in the creation of a stable structure.

Representative examples of heterocycloalkyl groups for use herein include, by way of example, a substituted or unsubstituted heterocylic ring radical as defined herein directly bonded to an alkyl group as defined herein. The heterocycloalkyl radical may be attached to the main structure at a carbon atom in the alkyl group that results in the creation of a stable structure.

Representative examples of a carboxylic acid-containing group for use herein include, by way of example, a carboxylic acid group attached to the rest of the molecule via a linking group, e.g., of the general formula —$R^{12}C(O)OH$, wherein $R^{12}$ is a bond, a substituted or unsubstituted alkylene group, a substituted or unsubstituted cycloalkylene, a substituted or unsubstituted cycloalkylalkyene group, a substituted or unsubstituted arylene or a substituted or unsubstituted arylalkylene group as defined herein, e.g., —$CH(Ar)(C(O)OH)$, —$C(CH_3)(C(O)OH)$, and the like.

The substituents in the 'substituted oxygen', 'substituted nitrogen', 'substituted sulfur', 'substituted alkyl', 'substituted alkylene', 'substituted cycloalkyl', 'substituted cycloalkylalkyl', 'substituted cycloalkenyl', 'substituted arylalkyl', 'substituted aryl', 'substituted heterocyclic ring', 'substituted heteroaryl ring,' 'substituted heteroarylalkyl', 'substituted heterocycloalkyl ring', 'substituted cyclic ring' may be the same or different and include one or more substituents such as hydrogen, hydroxy, halogen, carboxyl, cyano, nitro, oxo (=O), thio(=S), substituted or unsubstituted alkyl, substituted or unsubstituted alkoxy, substituted or unsubstituted alkenyl, substituted or unsubstituted alkynyl, substituted or unsubstituted aryl, substituted or unsubstituted arylalkyl, substituted or unsubstituted cycloalkyl, substituted or unsubstituted cycloalkenyl, substituted or unsubstituted amino, substituted or unsubstituted aryl, substituted or unsubstituted heteroaryl, substituted heterocycloalkyl ring, substituted or unsubstituted heteroarylalkyl, substituted or unsubstituted heterocyclic ring, and the like.

Representative examples of RAFT agents for use herein include, but are not limited to, benzyl dodecyl trithiocarbonate, ethyl-2-dodecyl trithiocarbonyl)proprionate, S-sec propionic acid O-ethyl xanthate, α-ethyl xanthylphenylacetic acid, ethyl α-(o-ethyl xanthyl) proprionate, ethyl α-(ethyl xanthyl)phenyl acetate, ethyl 2-(dodecyl trithiocarbonyl) phenyl acetate, ethyl 2-(dodecyl trithiocarbonyl)propionate, 2-(dodecylthiocarbonylthiol)propanoic acid, and the like and mixtures thereof.

There is no particular limitation on the organic chemistry used to form the RAFT agent and is within the purview of one skilled in the art. Also, the working examples below provide guidance. For example, the RAFT agents can be prepared as exemplified in Schemes I-III below.

SCHEME I

SCHEME II

SCHEME III

In one embodiment, an ethylenically unsaturated-containing non-amphiphilic macromonomer is obtained from a RAFT polymerization which involves (1) mixing a hydrophilic monomer or hydrophobic monomer with a RAFT agent; (2) adding a polymerization initiator; (3) and subjecting the mixture to a source of heat. Typical initiators include free-radical-generating polymerization initiators of the type illustrated by acetyl peroxide, lauroyl peroxide, decanoyl peroxide, coprylyl peroxide, benzoyl peroxide, tertiary butyl peroxypivalate, sodium percarbonate, tertiary butyl peroctoate, and azobis-isobutyronitrile (AIBN). The level of initiator employed will vary within the range of 0.01 to 2 weight percent of the mixture of monomers. If desired, a mixture of the above-mentioned monomers is warmed with addition of a free-radical former.

The reaction can be carried out at a temperature of between about 40° C. to about 100° C. for about 2 to about 24 hours. The reaction can be carried out in the presence of a suitable solvent. Suitable solvents are in principle all solvents which dissolve the monomer used, for example, carboxamides such as dimethylformamide; dipolar aprotic solvents such as dimethyl sulfoxide; ketones such as acetone or cyclohexanone; hydrocarbons such as toluene and the like.

Next, the ethylenically unsaturated-containing moiety is introduced in a subsequent step by use of a derivatization agent. Suitable derivatization agents may be the use of excess methacrylic anhydride, methacryloyl chloride, 2-isocyanoethylmethacrylate and the like, in the case of methacrylation reactions. Other derivatization agents include, by way of example, allyl alcohol, allyl bromide and the like for the addition of allyl groups; or vinyl isocyanate, vinyl chloroformate and the like for the addition of N-vinyl and O-vinyl groups. These examples are not intended to be limiting and one skilled in the art can list various modifications to introduce ethylenically unsaturated groups to form the non-amphiphilic macromonomer.

In another embodiment, an ethylenically unsaturated-containing non-amphiphilic macromonomers can be obtained from a RAFT polymerization which involves (1) mixing a diethylenically unsaturated-containing monomer such as allyl methacrylate (in which one of the ethylenically unsaturated groups preferentially polymerizes) and a RAFT agent; (2) adding a polymerization initiator; (3) and subjecting the mixture to a source of heat. Typical initiators include free-radical-generating polymerization initiators described above. The reaction can be carried out at a temperature of between about 40° C. to about 100° C. for about 2 to about 24 hours.

If desired, the reaction can be carried out in the presence of a suitable solvent. Suitable solvents are in principle all solvents which dissolve the monomer used, for example, carboxamides such as dimethylformamide; dipolar aprotic solvents such as dimethyl sulfoxide; ketones such as acetone or cyclohexanone; hydrocarbons such as toluene and the like.

Next, a hydrophilic or hydrophobic monomer is introduced to form a hydrophilic or hydrophobic homopolymer in the macromonomer.

Non-limiting schematic representations of various synthetic methods for making the ethylenically unsaturated-containing non-amphiphilic macromonomers disclosed herein with a RAFT agent are set forth below in Schemes IV-VI.

SCHEME IV

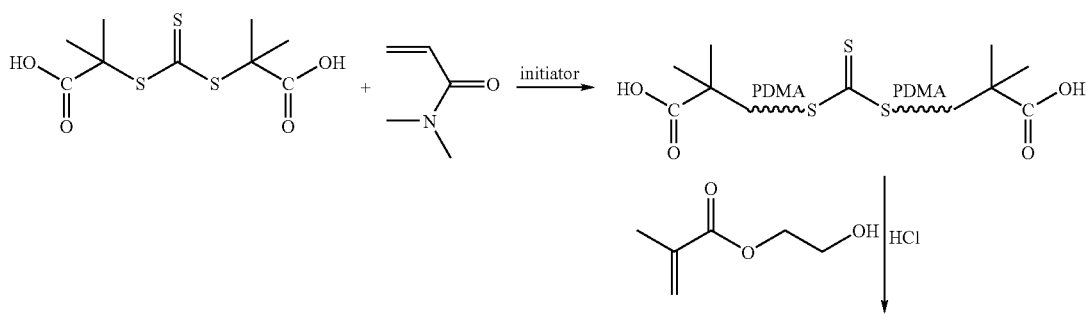

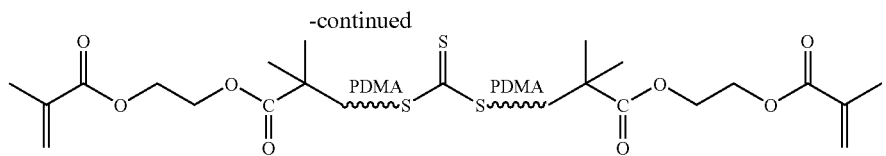

SCHEME V

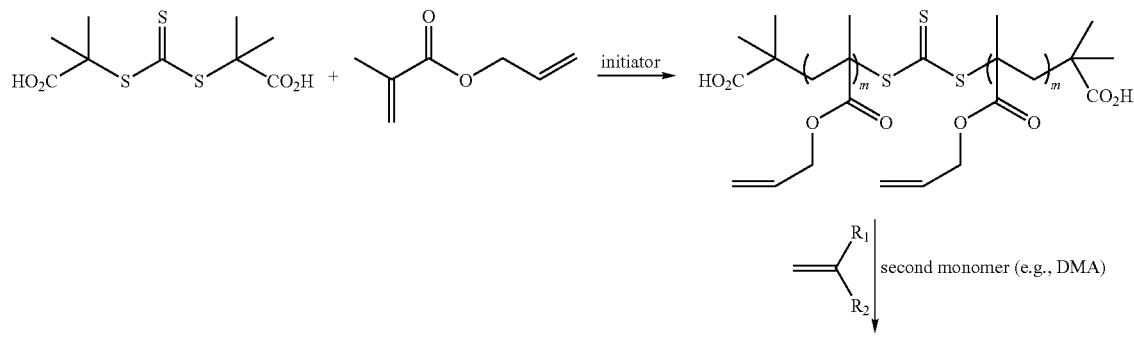

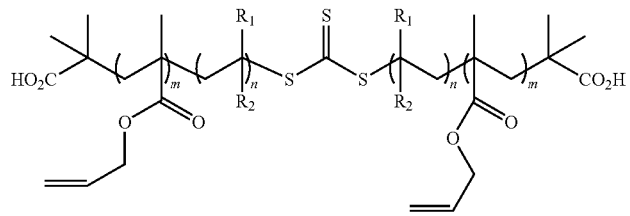

wherein $R_1$ and $R_2$ are any substituent are any radical capable of rendering the monomer hydrophilic or hydrophobic; m is independently from about 1 to about 20, and n is independently from about 10 to about 2000.

SCHEME VI

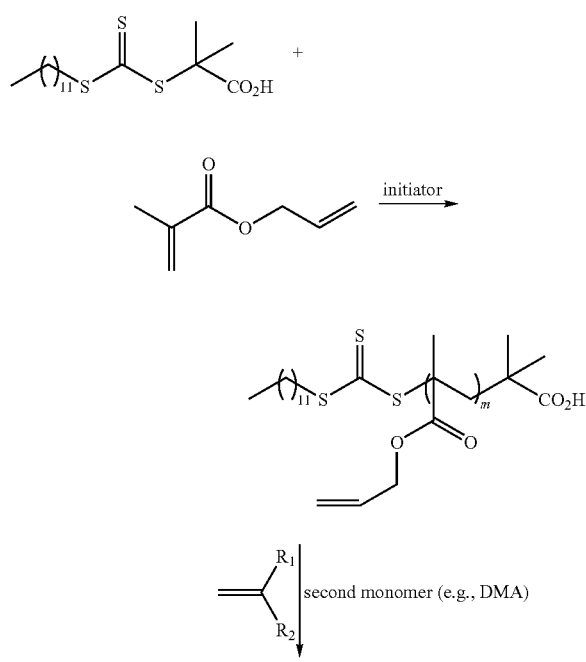

-continued

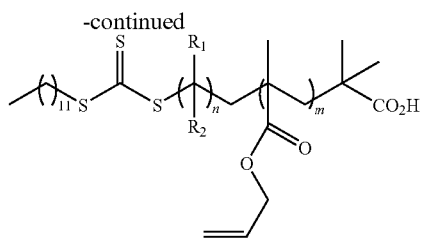

wherein $R_1$, $R_2$, m and n have the aforestated meanings.

In the case where the ethylenically unsaturated-containing non-amphiphilic macromonomer comprising hydrophilic units or hydrophobic units is obtained from ATRP polymerization, the ethylenically unsaturated group(s) may be introduced by appropriate selection of a suitable ATRP initiator or by displacement reactions of the terminal halogen atom. Suitable ATRP groups for use herein include any standard monofunctional or difunctional ATRP group as is well known to those of ordinary skill in the art. A comprehensive review on the use of ATRP initiators or displacement of the terminal halogen using electrophilic, nucleophilic, and radical reactions to produce telechelic polymers is disclosed in, for example, Matyjaszewski, K.; Xia, *J. Chem. Rev.*, 101, 2921-2990 (2001).

In one embodiment, a useful ATRP group includes an ethylenically unsaturated ATRP initiator such as, for example, vinyl functionalized ATRP initiators, e.g., prop-2-enyl-2'-bromoisobutyrate, vinyl chloroacetate, allyl chloroacetate, allyl bromide and the like. These initiators are used to polymerize either hydrophilic monomers or hydrophobic monomers.

In another embodiment, a useful ATRP group includes a non-ethylenically unsaturated ATRP initiator that can be converted to an ethylenically unsaturated initiator by a subsequent step. Examples of such initiators include hydroxyethyl 2-bromopropionate, glycidol 2-bromopropionate, tert-butyl 2-bromopropionate, and 4-bromobenzyl bromide, and the like. These initiators are used to polymerize either hydrophilic monomers or hydrophobic monomers, and are then converted to ethylenically unsaturated groups by suitable derivatization agents as discussed above.

In another embodiment, an ethylenically unsaturated-containing non-amphiphilic macromonomer comprising hydrophilic units or hydrophobic units is obtained from ATRP polymerization which involves (1) polymerizing a hydrophilic monomer or hydrophobic monomer using an ATRP initiator and suitable ATRP catalyst; (2) derivatizing the terminal halogen using electrophilic, nucleophilic, and radical reactions to give ethylenic unsaturation. In one example, the unsaturated terminal group can be converted using an ethylenically unsaturated containing agent such as allyl alcohol The reaction can be carried out at a temperature of between about 50° C. to about 150° C. for about 1 to about 48 hours. The reaction can be carried out in the presence of a suitable solvent. Suitable solvents are in principle all solvents which dissolve the monomer used, for example, carboxamides such as dimethylformamide; dipolar aprotic solvents such as dimethyl sulfoxide; ketones such as acetone or cyclohexanone; hydrocarbons such as toluene and the like.

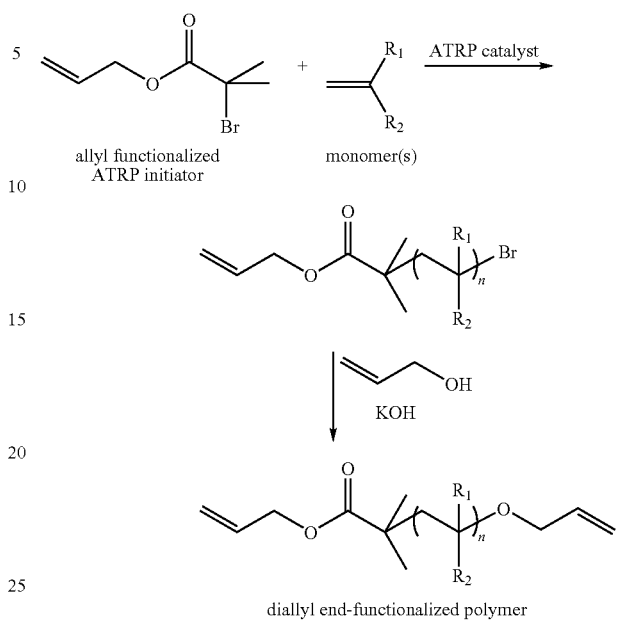

wherein $R_1$ and $R_2$ have the aforestated meanings and n is from about 10 to about 3000.

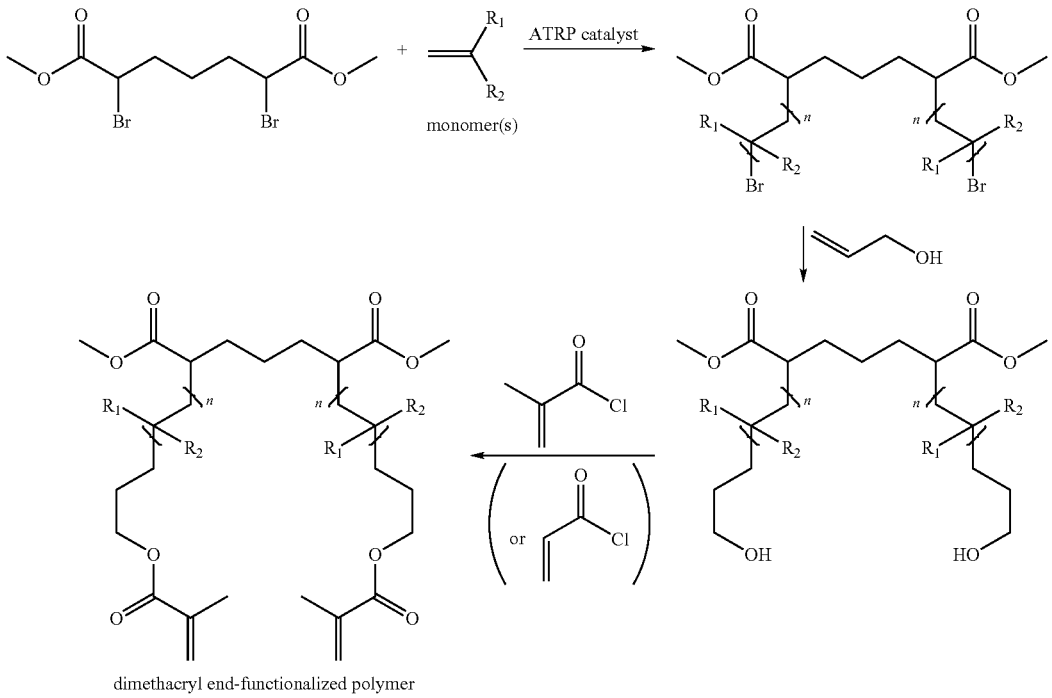

Non-limiting schematic representations of various synthetic methods for making the ethylenically unsaturated-containing non-amphiphilic macromonomers disclosed herein with an ATRP agent are set forth below in Schemes VII and VIII.

wherein $R_1$, $R_2$ and n have the aforestated meanings.

The resulting ethylenically unsaturated-containing non-amphiphilic macromonomers can have a number average molecular weight ranging from about 1000 to about 300,000 and preferably from about 10,000 to about 100,000.

The mixtures to be polymerized to form a biomedical device of the present invention can further include conventional biomedical device-forming or ophthalmic lens-forming monomers. As used herein, the term "monomer" or "monomeric" and like terms denote relatively low molecular weight compounds that are polymerizable by free radical polymerization, as well as higher molecular weight compounds also referred to as "prepolymers", "macromonomers", and related terms. Generally, the biomedical device-forming comonomer contains at least one polymerizable group or free radical polymerizable group. Suitable polymerizable groups or free radical polymerizable groups are selected from (meth)acrylate, (meth)acrylamide, styrenyl, alkenyl, vinyl carbonate, vinyl carbamate groups and mixtures thereof. In one embodiment, a suitable comonomer includes hydrophobic monomers, hydrophilic monomers and the like and mixtures thereof.

Representative examples of hydrophilic comonomers include, but are not limited to, unsaturated carboxylic acids, such as methacrylic and acrylic acids; (meth)acrylic substituted alcohols or polyols such as 2-hydroxyethyl methacrylate, 2-hydroxyethyl acrylate, glyceryl methacrylate and the like; vinyl lactams such as N-vinylpyrrolidone and the like; and (meth)acrylamides such as methacrylamide, N,N-dimethylacrylamide and the like and combinations thereof. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. The hydrophilic monomers can be present in the mixtures in an amount ranging from about 0.1 to about 90 weight percent, based on the total weight of the mixture.

According to various preferred embodiments, the initial mixture to be polymerized can comprise at least one (meth) acrylic substituted alcohol, such as at least one of 2-hydroxyethyl methacrylate and glyceryl methacrylate, preferably in an amount of at least about 0.1 to about 50 weight percent. Preferably, the mixture to be polymerized further includes at least one vinyl lactam, such as N-vinylpyrrolidone and/or at least one (meth)acrylamide, such as N,N-dimethylacrylamide.

Suitable hydrophobic monomers include $C_1$-$C_{20}$ alkyl and $C_3$-$C_{20}$ cycloalkyl (meth)acrylates, substituted and unsubstituted $C_6$-$C_{30}$ aryl(meth)acrylates, (meth)acrylonitriles, fluorinated alkyl methacrylates, long-chain acrylamides such as octyl acrylamide, and the like. The hydrophobic monomers can be present in the mixtures in an amount ranging from about 0.1 to about 90 weight percent, based on the total weight of the mixture.

Another class of biomedical device-forming or lens-forming monomers is silicone-containing monomers. In other words, a silicone-containing comonomer which contains from 1 to about 60 silicone atoms, in addition to the random copolymer, may be included in the initial mixture, for example, if it is desired to obtain a polymerization product with high oxygen permeability. Applicable silicone-containing monomers for use in the formation of contact lenses such as silicone hydrogels are well known in the art and numerous examples are provided in, for example, U.S. Pat. Nos. 4,136,250; 4,153,641; 4,740,533; 5,034,461; 5,070,215; 5,260,000; 5,310,779; and 5,358,995.

Representative examples of applicable silicon-containing monomers include bulky polysiloxanylalkyl(meth)acrylic monomers. An example of a bulky polysiloxanylalkyl(meth) acrylic monomer is represented by the structure of Formula I:

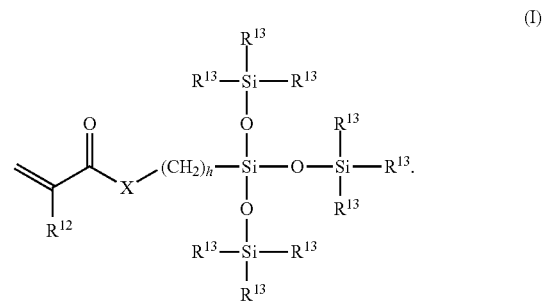

wherein X denotes —O— or —NR— wherein R denotes hydrogen or a $C_1$-$C_4$ alkyl; $R^{12}$ independently denotes hydrogen or methyl; each $R^{13}$ independently denotes a lower alkyl radical, phenyl radical or a group represented by

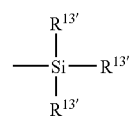

wherein each $R^{13'}$ independently denotes a lower alkyl or phenyl radical; and h is 1 to 10.

Representative examples of other applicable silicon-containing monomers includes, but are not limited to, bulky polysiloxanylalkyl carbamate monomers as generally depicted in Formula Ia:

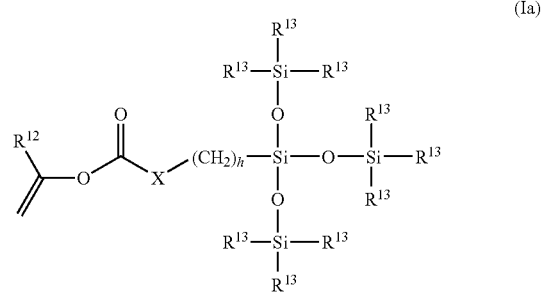

wherein X denotes —NR—; wherein R denotes hydrogen or a $C_1$-$C_4$ alkyl; $R^{12}$ denotes hydrogen or methyl; each $R^{13}$ independently denotes a lower alkyl radical, phenyl radical or a group represented by

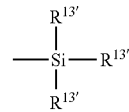

wherein each $R^{13'}$ independently denotes a lower alkyl or phenyl radical; and h is 1 to 10, and the like.

Examples of bulky monomers are 3-methacryloyloxypropyltris(trimethyl-siloxy)silane or tris(trimethylsiloxy)silylpropyl methacrylate, sometimes referred to as TRIS and tris (trimethylsiloxy)silylpropyl vinyl carbamate, sometimes referred to as TRIS-VC and the like and mixtures thereof.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyldisiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like.

Another class of silicon-containing monomers includes polyurethane-polysiloxane macromonomers (also sometimes referred to as prepolymers), which may have hard-soft-hard blocks like traditional urethane elastomers. Examples of silicone urethanes are disclosed in a variety or publications, including Lai, Yu-Chin, "The Role of Bulky Polysiloxanylalkyl Methacrylates in Polyurethane-Polysiloxane Hydrogels," Journal of Applied Polymer Science, Vol. 60, 1193-1199 (1996). PCT Published Application No. WO 96/31792 also discloses examples of such monomers, the contents of which are hereby incorporated by reference in its entirety. Further examples of silicone urethane monomers are represented by Formulae II and III:

$$E(*D*A*D*G)_a*D*A*D*E'; \text{ or} \qquad (II)$$

$$E(*D*G*D*A)_a*D*A*D*E'; \text{ or} \qquad (III)$$

wherein:

D denotes an alkyl diradical, an alkyl cycloalkyl diradical, a cycloalkyl diradical, an aryl diradical or an alkylaryl diradical having 6 to about 30 carbon atoms;

G denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;

* denotes a urethane or ureido linkage;

a is at least 1;

A denotes a divalent polymeric radical of Formula IV:

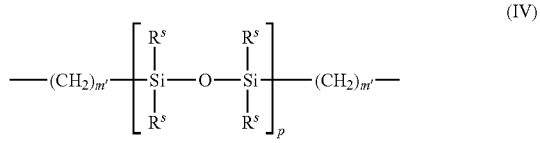

wherein each $R^s$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;

each of E and E' independently denotes a polymerizable unsaturated organic radical represented by Formula V:

wherein: $R^8$ is hydrogen or methyl;

$R^9$ is independently hydrogen, an alkyl radical having 1 to 6 carbon atoms, or a —CO—Y—$R^{11}$ radical wherein Y is —O—, —S— or —NH—;

$R^{10}$ is a divalent alkylene radical having 1 to about 10 carbon atoms;

$R^{11}$ is a alkyl radical having 1 to about 12 carbon atoms;

X denotes —CO— or —OCO—;

Z denotes —O— or —NH—;

Ar denotes an aromatic radical having about 6 to about 30 carbon atoms;

w is 0 to 6; x is 0 or 1; y is 0 or 1; and z is 0 or 1.

A preferred silicone-containing urethane monomer is represented by Formula VI:

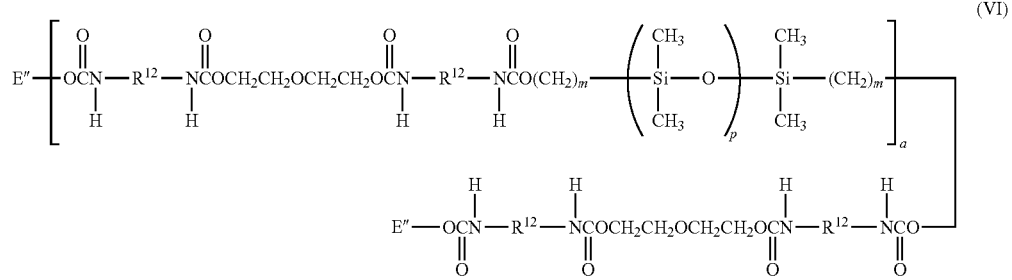

wherein m is at least 1 and is preferably 3 or 4, a is at least 1 and preferably is 1, p is a number which provides a moiety weight of about 400 to about 10,000 and is preferably at least about 30, $R^{12}$ is a diradical of a diisocyanate after removal of the isocyanate group, such as the diradical of isophorone diisocyanate, and each E" is a group represented by:

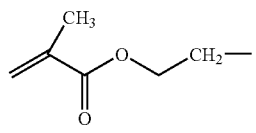

Another class of representative silicone-containing monomers includes fluorinated monomers. Such monomers have been used in the formation of fluorosilicone hydrogels to reduce the accumulation of deposits on contact lenses made therefrom, as described in, for example, U.S. Pat. Nos. 4,954,587; 5,010,141 and 5,079,319. The use of silicone-containing monomers having certain fluorinated side groups, i.e., —(CF$_2$)—H, have been found to improve compatibility between the hydrophilic and silicone-containing monomeric units, see, e.g., U.S. Pat. Nos. 5,321,108 and 5,387,662.

The above silicone materials are merely exemplary, and other materials for use in forming biomedical devices according to the present invention and have been disclosed in various publications and are being continuously developed for use in contact lenses and other biomedical devices can also be used. For example, a biomedical device-forming comonomer can be a cationic monomer such as cationic silicone-containing monomer or cationic fluorinated silicone-containing monomers.

The mixtures to be polymerized may include the silicone comonomer, in addition to the subject ethylenically unsaturated macromonomer, at 0 to about 50 weight percent, preferably about 5 to about 30 weight percent when present.

The mixtures to be polymerized can also include a crosslinking monomer (a crosslinking monomer being defined as a monomer having multiple polymerizable functionalities). Representative crosslinking monomers include: divinylbenzene, allyl methacrylate, ethyleneglycol dimethacrylate, tetraethyleneglycol dimethacrylate, polyethyleneglycol dimethacrylate, vinyl carbonate derivatives of the glycol dimethacrylates, and methacryloxyethyl vinylcarbonate. When a crosslinking agent is employed, this monomeric material may be included in the monomer mixture at about 0.1 to about 20 weight percent, and more preferably at about 0.2 to about 10 weight percent.

Although not required, the ethylenically unsaturated macromonomer within the scope of the present invention may optionally have one or more strengthening agents added prior to polymerization, preferably in quantities of less than about 80 weight percent and preferably from about 20 to about 60 weight percent. Non-limiting examples of suitable strengthening agents are described in U.S. Pat. Nos. 4,327,203; 4,355,147; and 5,270,418; each of which is incorporated herein in its entirety by reference. Specific examples, not intended to be limiting, of such strengthening agents include cycloalkyl acrylates and methacrylates; e.g., tert-butylcyclohexyl methacrylate and isopropylcyclopentyl acrylate.

The mixtures to be polymerized may further contain, as necessary and within limits not to impair the purpose and effect of the present invention, various additives such as an antioxidant, coloring agent, ultraviolet absorber, lubricant internal wetting agents, toughening agents and the like and other constituents as is well known in the art.

The biomedical devices of the present invention, e.g., contact lenses or intraocular lenses, can be prepared by polymerizing the foregoing mixtures to form a product that can be subsequently formed into the appropriate shape by, for example, lathing, injection molding, compression molding, cutting and the like. For example, in producing contact lenses, the initial mixture may be polymerized in tubes to provide rod-shaped articles, which are then cut into buttons. The buttons may then be lathed into contact lenses.

Alternately, the biomedical devices such as contact lenses may be cast directly in molds, e.g., polypropylene molds, from the mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the mixtures to be polymerized to a mold, and spinning the mold in a controlled manner while exposing the mixture to a radiation source such as UV light. Static casting methods involve charging the mixture between two mold sections, one mold section shaped to form the anterior lens surface and the other mold section shaped to form the posterior lens surface, and curing the mixture while retained in the mold assembly to form a lens, for example, by free radical polymerization of the mixture.

Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetyl peroxide, lauroyl peroxide, decanoyl peroxide, stearoyl peroxide, benzoyl peroxide, tertiarylbutyl peroxypivalate, peroxydicarbonate, and the like. Representative UV initiators are those known in the art and include benzoin methyl ether, benzoin ethyl ether, Darocure 1173, 1164, 2273, 1116, 2959, 3331 (EM Industries) and Irgacure 651 and 184 (Ciba-Geigy), and the like. Generally, the initiator will be employed in the monomeric mixture at a concentration of about 0.01 to about 5 percent by weight of the total mixture.

Polymerization is generally performed in a reaction medium, such as, for example, a solution or dispersion using a solvent, e.g., water or an alkanol containing from 1 to 12 carbon atoms such as methanol, ethanol or propan-2-ol. Alternatively, a mixture of any of the above solvents may be used.

Generally, polymerization can be carried out for about 15 minutes to about 72 hours, and under an inert atmosphere of, for example, nitrogen or argon. If desired, the resulting polymerization product can be dried under vacuum, e.g., for about 5 to about 72 hours or left in an aqueous solution prior to use.

Polymerization of the mixtures will yield a polymer, that when hydrated, forms a hydrogel. Generally, the mixture will contain the ethylenically unsaturated-containing non-amphiphilic macromonomer in an amount ranging from about 0.1 to about 60 weight percent, and preferably about 5 to about 25 weight percent, based on the total weight of the mixture. The biomedical device-forming comonomer may be present in the mixture in an amount ranging from about 40 to about 99.9 weight percent, and preferably from about 75 to about 95 weight percent, based on the total weight of the mixture.

When producing a hydrogel lens, the mixture may further include at least a diluent that is ultimately replaced with water when the polymerization product is hydrated to form a hydrogel. Generally, the water content of the hydrogel is greater than about 5 weight percent and more commonly between about 10 to about 80 weight percent. The amount of diluent used should be less than about 50 weight percent and in most cases, the diluent content will be less than about 30 weight percent. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

In the case of intraocular lenses, the mixtures to be polymerized may further include a monomer for increasing the refractive index of the resultant copolymer. Examples of such monomers are aromatic (meth)acrylates, such as phenyl (meth)acrylate, 2-phenylethyl(meth)acrylate, 2-phenoxyethyl methacrylate, and benzyl(meth)acrylate.

The biomedical devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to individual lens packages containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative of the invention. The examples should not be read as limiting the scope of the invention as defined in the claims.

In the examples, the following abbreviations are used.
DMA: N,N-dimethylacrylamide
HEMA: 2-hydroxyethyl methacrylate
NVP: N-vinyl-2-pyrrolidone
AIBN: azo bis-isobutylnitrile (Vazo™ 64)
TRIS: 3-methacryloxypropyltris(trimethylsiloxy)silane
HEMAVC: methacryloxyethyl vinyl carbonate
IMVT: 1,4-bis(4-(2-methacryloxyethyl)phenylamino)anthraquinone
THF: tetrahydrofuran Example 1

Preparation of Ethyl α-(o-ethyl xanthyl)proprionate Having the Following Structure

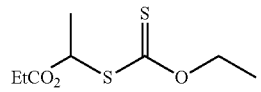

A 500 mL round bottom 3 neck flask was fitted with a magnetic stirrer, nitrogen inlet, and a temperature probe. Ethyl-2-bromo propionate (27.2 g) and 500 mL absolute ethanol were combined and stirred for 20 minutes under nitrogen. The reaction flask was placed in an ice/water bath at 0° C. Potassium O-ethyl xanthate (26.4 g) was slowly added using a powder funnel. The funnel was rinsed with an additional 50 mL of ethanol. The reaction flask was allowed to stir for an additional 24 hours at room temperature. Deionized water (250 mL) was then added to the reaction flask. The crude mixture was extracted 4 times with 200 mL of 2:1 hexane:ethyl ether retaining the organic layers. The combined organic layers were dried over sodium sulfate, filtered and solvent was removed under reduced pressure to obtain 32.22 grams of the desired product (a 97% yield).

Example 2

Preparation of α,-(Ethyl Xanthyl)Toluene Having the Following Structure

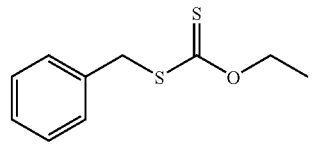

A 250 mL round bottom 3 neck flask was fitted with a magnetic stirrer, nitrogen inlet, Freidrich's condenser, and a temperature probe. After absolute ethanol (125 mL), and benzyl bromide (14.4 g) were added, the reaction flask was placed in an ice/water bath at 0° C. and stirred for 1 hour. Potassium O-ethyl xanthate (17.63 g) was added slowly to the reaction flask using a powder funnel. The reaction flask was stirred for an additional 16 hours at room temperature and 200 mL of purified water was added to the flask. The crude mixture was extracted 3 times with 200 mL of 2:1 pentane:ethyl ether retaining the organic layers. The combined organic layers were dried over anhydrous sodium sulfate, filtered and solvent was removed under reduced pressure leaving 15.09 grams (an 84.6% yield) of the desired product.

Example 3

Preparation of (1-Phenyl Ethyl)Ethyl Xanthate Having the Following Structure

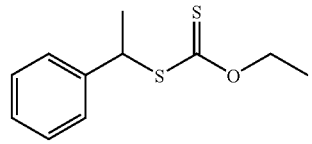

A 500 mL round bottom 3 neck flask was fitted with a magnetic stirrer, nitrogen inlet, and a temperature probe, 1-bromoethyl benzene (20.5 mL) and 200 mL absolute ethanol were added. The reaction flask was placed in an ice/water bath at 0° C. Potassium O-ethyl xanthate was added slowly using a powder funnel rinsed into the reaction flask with an additional 100 mL ethanol. The reaction flask was allowed to stir for an additional 24 hours at room temperature and then 250 mL of purified water was added. The crude mixture was extracted 4 times with 200 mL of 2:1 heptane:ethyl ether retaining the organic layers. The combined organic layers were dried over anhydrous sodium sulfate, filtered and the solvent was removed under reduced pressure to yield 31.42 grams of crude product. A portion, 15 grams, of the crude product was eluted from a silica gel column using hexane to give 12.81 grams of the pure product.

Example 4

Preparation of Naphthyl-O-Ethyl Xanthate Having the Following Structure

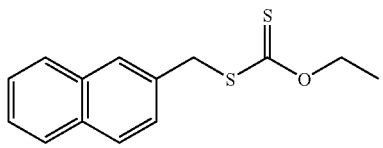

A 1000 mL round bottom 3 neck flask fitted with a mechanical stirrer, nitrogen inlet, Freidrich's condenser, and a temperature probe was charged with 500 mL of ethanol: 1,4 dioxane, and 2-(bromomethyl naphthalene) (22.1 g). The reaction flask was placed in an ice/water bath at 0° C. and potassium O-ethyl xanthate (17.63 g) was added slowly using a powder funnel. The reaction stirred for an additional 16 hours at room temperature and 500 mL of purified water was added. The crude mixture was extracted 2 times with 500 mL of 50:50 hexane:ethyl ether, hexane, and methylene chloride retaining the organic layers. The combined organic layers were dried over anhydrous sodium sulfate, filtered and solvent was removed under reduced pressure leaving the product, a yellow oil 22.52 g (an 85.8% yield).

Example 5

Preparation of S-Sec Propionic Acid O-Ethyl Xanthate

A 1000 mL round bottom 3 neck flask was equipped with a Friedrich condenser, a magnetic stirring bar, nitrogen inlet, and a temperature probe. 2-Bromo propionic acid and 600 mL absolute ethanol were combined and stirred for 20 minutes under nitrogen. Potassium O-ethyl xanthate was added slowly using a powder funnel to the reaction flask and rinsed with an additional 50 mL of ethanol. The reaction flask was allowed to stir at a gentle reflux over night and then quenched with 250 mL of DI water. The mixture was acidified with HCl and then extracted 3 times with 250 ml portions of ether. The combined organic layers were dried over magnesium sulfate and the solvents were removed from the filtrate by flash evaporation leaving 26.3 grams of crude product a light orange liquid. This reaction is generally shown below in Scheme IX.

SCHEME IX

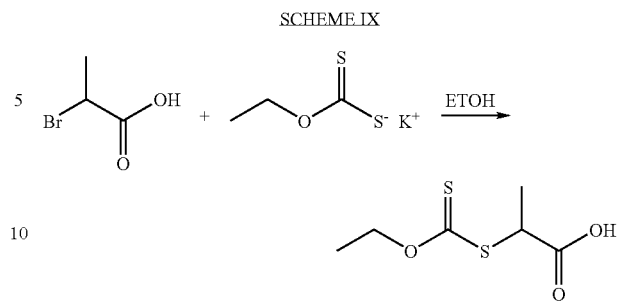

Example 6

Preparation of α-Ethyl Xanthylphenylacetic Acid

A 1000 mL round bottom 3 neck flask was fitted with a magnetic stirrer, nitrogen inlet, and a temperature probe, α-Bromophenylacetic acid (21.5 g) and 300 mL ethanol were added. Potassium O-ethyl xanthate was added slowly using a powder funnel rinsed into the reaction flask with an additional 100 mL absolute ethanol. The reaction flask was allowed to stir for an additional 24 hours at 60° C. and then 250 mL of purified water was added. The crude mixture was extracted 4 times with 200 mL of chloroform retaining the organic layers. The combined organic layers were dried over anhydrous sodium sulfate, filtered and the solvent was removed under reduced pressure to yield 5.18 grams the resulting product, a viscous liquid. This reaction is generally shown below in Scheme X.

SCHEME X

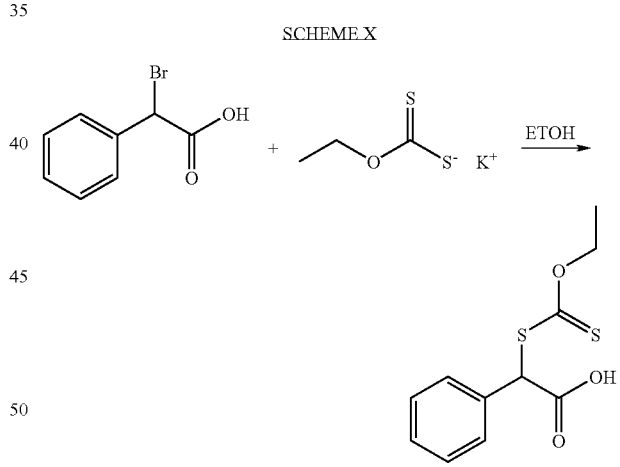

Example 7

Preparation of 2(Dodecylthiocarbonylthiol)propanoic Acid

A reaction flask was fitted a magnetic stirrer, ice bath, dropping funnel and a nitrogen inlet. The flask was charged with ethyl ether (150 ml) and 60% sodium hydride (6.3 grams). With stirring, dodecylmercaptan (30.76 grams) was slowly added to the cold slurry (temperature 5-10° C.). The grayish slurry was converted to a thick white slurry (sodium thiodecylate) with vigorous evolution of $H_2$ gas. The mixture was cooled to 0° C. and carbon disulfide (12 g) was added.

Following the addition, the ice bath was removed and the reaction was allowed to reach room temperature and the addition of 2-bromopropanoic acid (23.3 grams) followed by stirring overnight. The solution was filtered to remove the salt and recrystallization from heptane gave 21 grams of pale yellow needles. This reaction is generally shown below in Scheme XI.

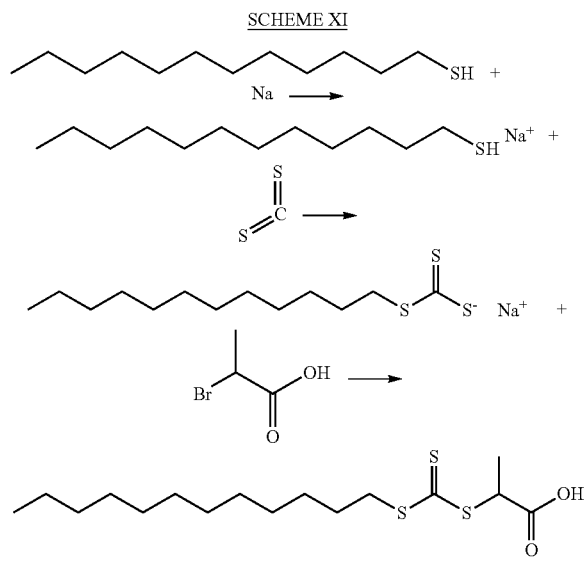

SCHEME XI

Example 8

Preparation of Ethyl α-(o-ethyl xanthyl)Proprionate

A 500 mL round bottom 3 neck flask was equipped with a Friedrich condenser, a magnetic stirring bar, nitrogen inlet, and a temperature probe. Ethyl-2-bromo propionate and 500 mL absolute ethanol were added and stirred for 20 minutes under nitrogen. The reaction flask was placed in an ice bath at 0°±3° C. Potassium O-ethyl xanthate was added slowly to the reaction flask using a powder funnel and rinsed with an additional 50 mL of ethanol. The reaction flask was allowed to stir and equilibrate to room temperature over a period of 24 hours. DI water (250 mL) was added to quench the reaction. The crude mixture was extracted 4 times with 200 mL of 2:1 hexane:ethyl ether retaining the organic layers. The combined organic layers were dried over sodium sulfate, filtered and solvent was removed under reduced pressure.

Example 9

Preparation of Ethyl α-(ethyl xanthyl)Phenyl Acetate

A 500 mL round bottom 3 neck flask was equipped with a magnetic stirrer, nitrogen inlet, Friedrich's condenser and a temperature probe. Ethyl (2-bromo-2-phenyl)acetate and 250 mL absolute ethanol were added and stirred for 20 minutes under nitrogen. The reaction flask was placed in an ice/water bath at 0° C. Potassium O-ethyl xanthate was added slowly using a powder funnel and rinsed into the reaction flask with an additional 50 mL of ethanol. The reaction flask was allowed to stir for an additional 24 hours at room temperature. DI water (250 mL) was then added to the reaction flask. The crude mixture was extracted 4 times with 200 mL of 2:1 hexane:ethyl ether retaining the organic layers. The combined organic layers were dried over sodium sulfate, filtered and solvent was removed under reduced pressure. Yield, 96%.

Example 10

Preparation of Ethyl 2-(dodecyl trithiocarbonyl)Proprionate

A 250 mL round bottom 3 neck flask was equipped with a mechanical stirrer, Friedrich's condenser and a temperature probe. Carbon disulfide and dodecanethiol were added to the flask with 65 mL chloroform. Triethylamine was added drop wise using an addition funnel with 10 mL chloroform. The reaction stirred for 3 hours at room temperature. Ethyl-α-bromo proprionate was added drop wise using an addition funnel with 25 mL chloroform. The reaction flask was allowed to stir for an additional 24 hrs at room temperature. The crude mixture was washed 2 times each with 250 mL of DI water, 5% HCl, and 5% Brine retaining the organic layers. The organic layers were dried over magnesium sulfate, filtered and solvent was removed under pressure. The product was further purified by column chromatography on silica gel using hexane:ethyl acetate.

Example 11

Preparation of Ethyl-α-(Dodecyl Trithiocarbonyl)Phenyl Acetate

A 250 mL round bottom 3 neck flask was equipped with a mechanical stirrer, Friedrich condenser and a temperature probe. Carbon disulfide and dodecanethiol were added to the flask with 65 mL chloroform. Triethylamine was added dropwise using an addition funnel with 10 mL chloroform. The reaction stirred for 3 hours at room temperature. Ethyl-α-bromophenyl acetate was added drop wise using an addition funnel with 35 mL chloroform. The reaction flask was allowed to stir for an additional 24 hours at room temperature. The crude mixture was washed 2 times with 250 mL of DI water, 5% HCl (aq), and 5% Brine retaining the organic layers. The organic layers were dried over magnesium sulfate, filtered and solvent was removed under pressure. The product was further purified by column chromatography on silica gel using hexane:ethyl acetate.

Example 12

Preparation of Diallyl-Functionalized Polymethylmethacrylate (PMMA)

To a round-bottom flask, seal the flask, deoxygenate and then back-fill with $N_2$ gas is added Cu(I)Br. After purging methylmethacrylate, solvent (e.g., tetrahydrofuran (THF)) and an appropriate ligand (e.g., N,N,N'N',N'''-pentamethyldiethyleneamine) with $N_2$ for approximately 30 minutes, add each component carefully with $N_2$-rinsed syringes. Bring the flask and contents to the reaction temperature and add an initiator (e.g., prop-2-enyl-2'-bromoisobutyrate). When the reaction reaches the desired conversion of monomer to polymer, remove from heat and cool to room temperature. Next, add THF to reduce viscosity and precipitate into methanol. The white precipitate is filtered and dried to obtain monoallyl functionalized PMMA. If desired, the precipitation process to remove remaining copper species can be repeated.

End-Group Substitution

The isolated PMMA is added to a flask containing allyl alcohol and potassium hydroxide (KOH) dissolved in THF. Stir at room temperature until reaction is complete. Concentrate using a rotary evaporator, and then reprecipitate into methanol to obtain diallyl functionalized PMMA. This reaction is generally shown below in Scheme XII.

SCHEME XII

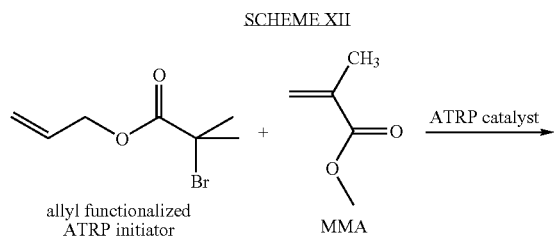

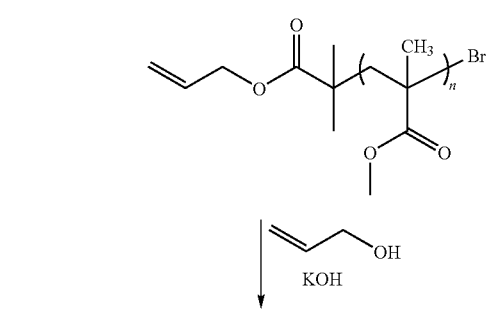

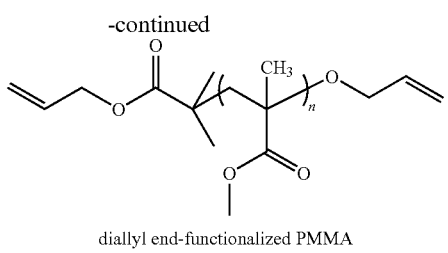

diallyl end-functionalized PMMA

Example 13

Preparation of Dimethacryl-Functionalized Polydimethylacrylamide (PDMA)

To a round-bottom flask is added S,S'-bis($\alpha,\alpha$'-dimethyl-$\alpha$"-acetic acid)trithiocarbonate, THF, AIBN and DMA, and the flask is sealed. Bubble $N_2$ through the solution for 30 minutes and bring the flask and contents to the reaction temperature. When the reaction reaches the desired conversion of monomer to polymer, remove from heat, and cool to room temperature. Next, add THF to reduce viscosity and precipitate into hexanes. The precipitate is filtered and dried to provide PDMA.

End-Group Substitution

Add oxalyl chloride to a flask containing the isolated PDMA. The mixture is warmed to 60° C. for 3 hours. Any excess oxalyl chloride is removed by applying a vacuum, and then 2-hydroxy methacrylate is added to the polymer. The mixture is stirred for 1 hour, and THF is added and precipitate into hexanes. The precipitate is filtered and dried to afford methacrylate functionalized PDMA. This reaction is generally shown below in Scheme XIII.

SCHEME XIII

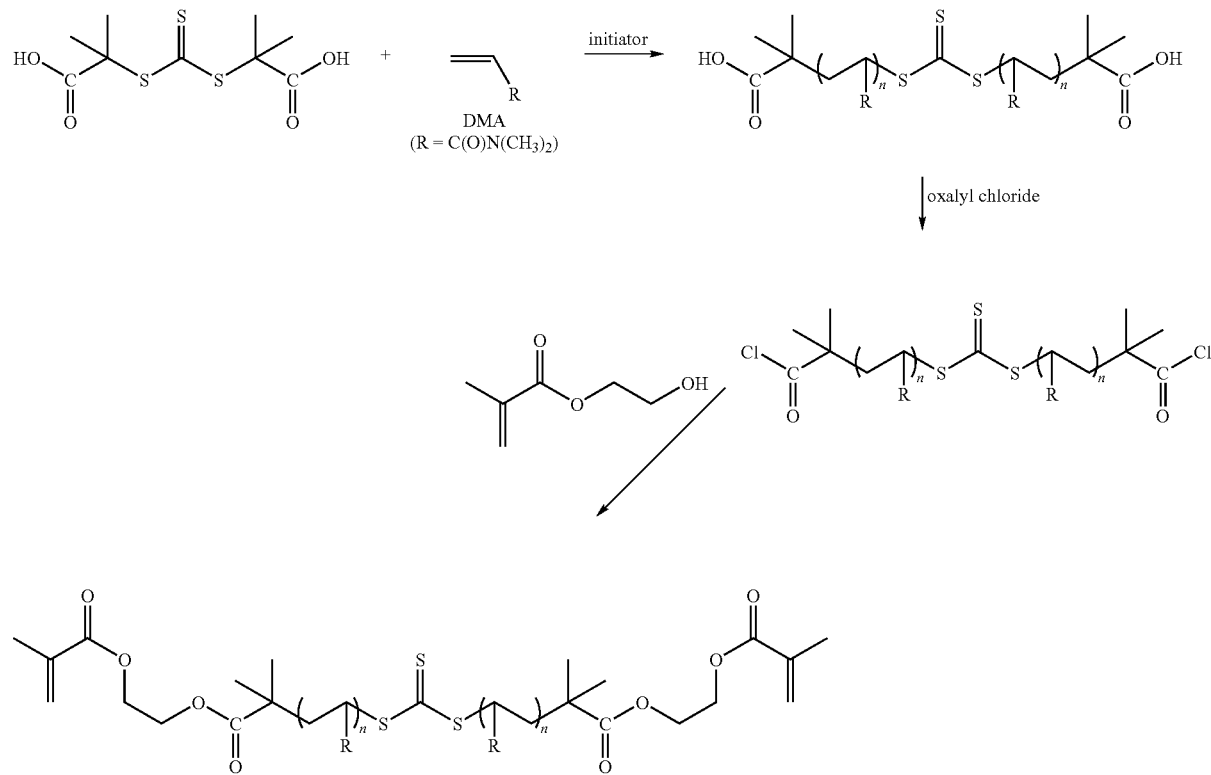

Example 14

Preparation of Dimethacryl-Functionalized PDMA

To a round-bottom flask is added Cu(I)Br. The flask is sealed, deoxygenated and then back-filled with $N_2$ gas. After purging DMA and an appropriate ligand (e.g., N,N,N'N',N''-pentamethyldiethyleneamine) with $N_2$ for approximately 30 minutes, add each component carefully with $N_2$-rinsed syringes. Bring the flask and contents to the reaction temperature and then add an initiator (e.g., 2,6-dibromoheptandioic acid). When the reaction reaches the desired conversion of monomer to polymer, remove from heat, and cool to room temperature. Next, add THF to reduce viscosity and precipitate into hexanes. The precipitate is filtered and dried to provide PDMA. If desired, the precipitation process to remove remaining copper species can be repeated.

End-Group Substitution

Oxalyl chloride is added to a flask containing the isolated PDMA. The flask is warmed to 60° C. for 3 hours. The excess oxalyl chloride is removed by applying a vacuum, and then 2-hydroxy methacrylate is added. The mixture is stirred for 1 hour, THF is added and precipitate into hexanes. The precipitate is filtered and dried to afford methacrylate functionalized PDMA. This reaction is generally shown below in Scheme XIV.

The acetone is removed under reduced pressure. The product is extracted in diethyl ether and is isolated by evaporating the solvent.

Preparation of 3'-azido-propyl 2-bromo propionate

A solution of 2-bromopropionyl bromide in THF is added dropwise to a solution of 3-azido-1-propanol and triethylamine in THF at 0° C. After complete addition, the reaction mixture is stirred overnight at room temperature. Triethylammonium bromide salt is filtered off and solvent is removed in vacuo. The crude product is dissolved in dichloromethane and is washed with saturated sodium bicarbonate solution and distilled water. The organic layer is dried with magnesium sulfate and the solvent is removed in vacuo.

Preparation of 3'-azidopropyl-2-(O-ethyl xanthyl)propionate

3'-Azidopropyl 2-bromopropionate is dissolved in chloroform and then stirred with an excess of O-ethylxanthic acid potassium salt for 3 days. Filter off the unreacted potassium (O-ethyl)xanthate and washed several times with chloroform. Chloroform is remove under vacuum to isolate the product.

Polymerization

3'-Azidopropyl-2-(O-ethyl xanthyl)propionate, AIBN, THF, and NVP is added to a round-bottom flask, the flask is

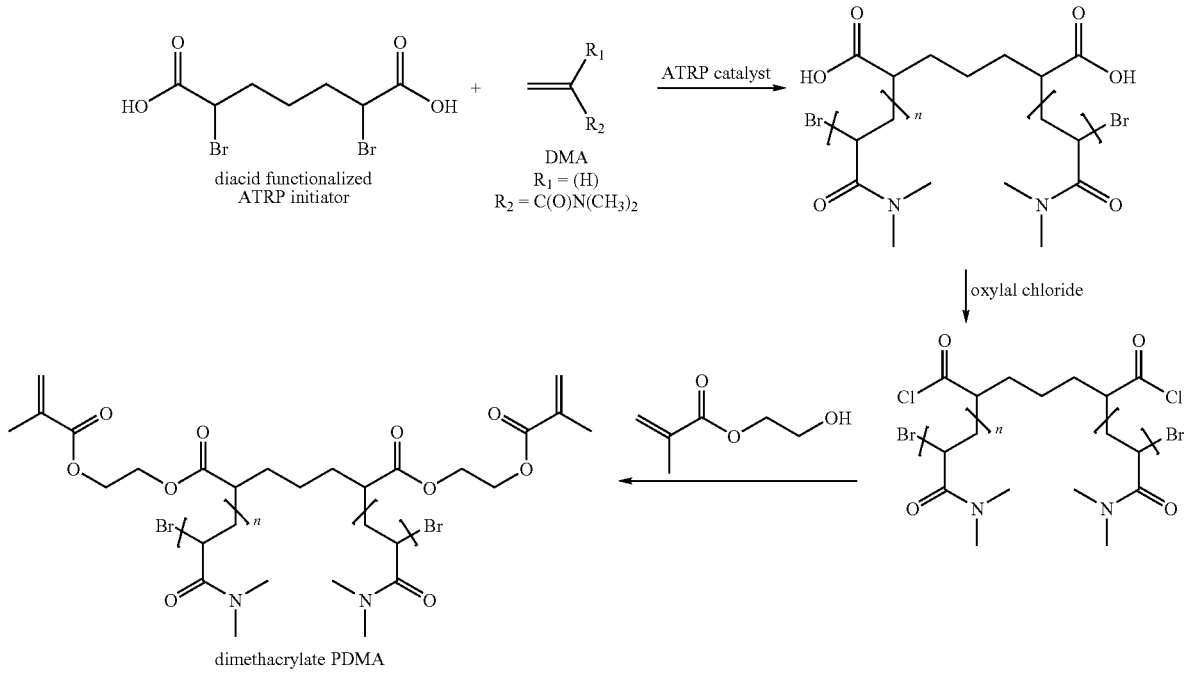

SCHEME XIV

Example 15

Preparation of Methacryl-Functionalized Polyvinylpyrollidone (PVP)

Preparation of 3-azido-1-propanol 3-bromo-1-propanol and sodium are dissolved in a mixture of acetone (180 mL) and water (30 mL) and reflux overnight.

sealed and $N_2$ is bubbled through the solution for 30 minutes. The flask and contents are brought to the reaction temperature. When the reaction reaches the desired conversion of monomer to polymer, it is removed from heat, and is cooled to room temperature. Next, THF is added to reduce viscosity and precipitate into hexanes. The precipitate is filtered and dried affording Azido-functionalized PVP.

End-Group Substitution

Azido-functionalized PVP is added to a round-bottom flask and is dissolved in acetone or other suitable solvent containing CuBr and N,N,N'N',N''-pentamethyldiethyleneamine. Next, propargyl methacrylate is added to this solution, stirred for 24 hours and then precipitate into hexanes. The precipitate is filter and dried affording methacrylate functionalized PVP. This reaction is generally shown below in Scheme XV.

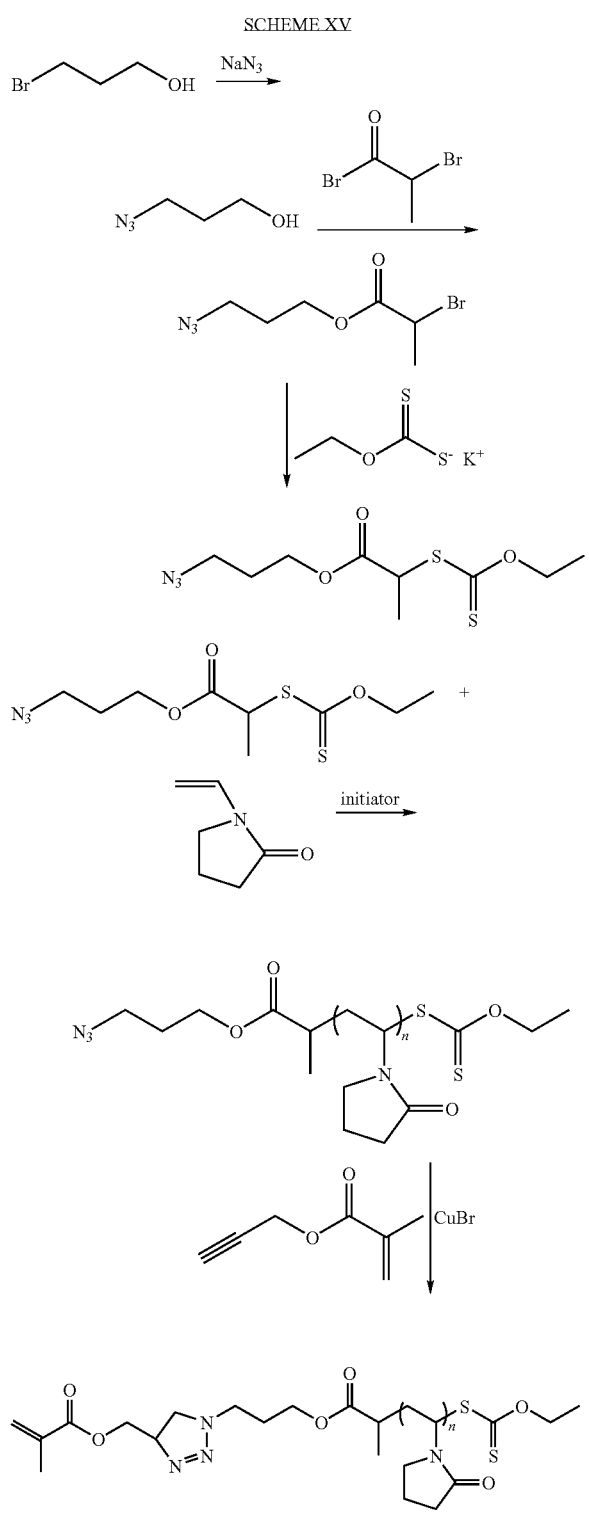

Example 16

Preparation of Methacryl-Functionalized PVP

Preparation of 3-azido-1-propanol

3-Bromo-1-propanol and sodium is dissolved in a mixture of acetone (180 mL) and water (30 mL) and refluxed overnight. Acetone is removed under reduced pressure and the product is extracted with diethyl ether. The product is isolated by evaporating the solvent.

Preparation of 3'-azido-propyl 2-bromo propionate

A solution of 2-bromopropionyl bromide in THF is added dropwise to a solution of 3-azido-1-propanol and triethylamine in THF at 0° C. After complete addition, the reaction mixture is stirred overnight at room temperature. Triethylammonium bromide salt is filtered off and the solvent is removed in vacuo. The crude product is dissolved in dichloromethane and washed with saturated sodium bicarbonate solution and distilled water. The organic layer is dried with magnesium sulfate and solvent is removed in vacuo.

Preparation of 3'-azidopropyl-2-(O-ethyl xanthyl)propionate

3'-Azidopropyl 2-bromopropionate is dissolved in chloroform and stirred with an excess of O-ethylxanthic acid potassium salt for 3 days. The unreacted potassium (O-ethyl)xanthate is filter off and washed several times with chloroform. Chloroform is removed under vacuum to isolate the product.

Preparation of 4''-hydroxymethyl-3'-(1,2,3-triazole) propyl-2-(O-ethyl xanthyl) propionate Propargyl alcohol and 3'-azidopropyl-2-(O-ethyl xanthyl) propionate is dissolve in acetone or suitable solvent, along with CuBr and N,N,N'N',N''-pentamethyldiethyleneamine and is stirred for 24 hours. Excess solvent is removed to isolate product.

4''-hydroxymethyl-3'-(1,2,3-triazole)propyl-2-(O-ethyl xanthyl)propionate, THF, AIBN and NVP is added to a round-bottom flask, the flask is sealed and $N_2$ is bubbled through the solution for 30 minutes. The flask and contents are brought to the reaction temperature. When the reaction reaches the desired conversion of monomer to polymer, it is removed from heat, and is cooled to room temperature. Next, THF is added to reduce viscosity and precipitate into hexanes. The precipitate is filtered and dried.

End-Group Substitution

Hydroxy-functionalized PVP is added to a dry round-bottom flask and is dissolved in chloroform. Methacryoyl chloride is slowly dripped into the flask while chilling with an ice water bath. The reaction is warmed to room temperature and stirred for 6 hours. The reaction mixture is added to a separatory funnel and washed two times with 0.1N HCl, two times with saturated brine, and concentrate on the rotary evaporator. Precipitate into hexanes. This reaction is generally shown below in Scheme XVI.

SCHEME XVI

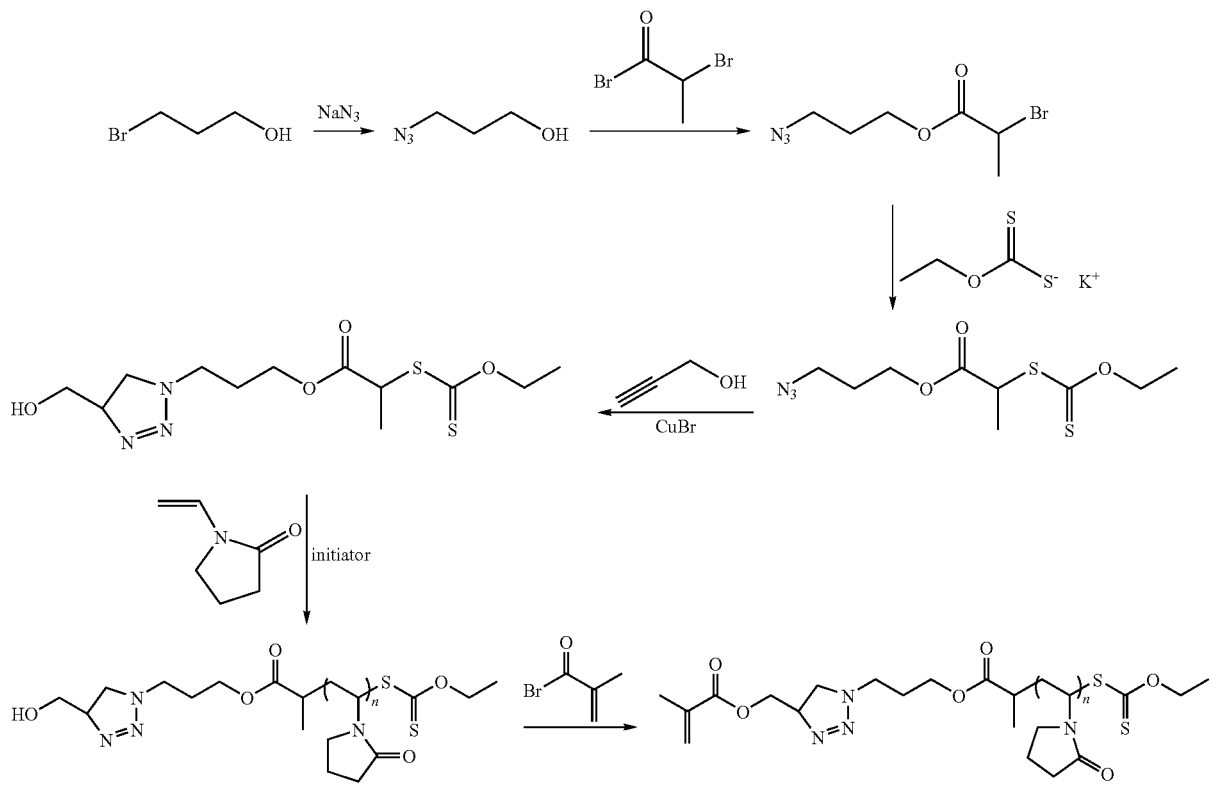

Example 17

Preparation of Allyl Functionalized PDMA 242 mg (0.858 mmol) of S,S'-bis(α,α'-dimethyl-α"-acetic acid) trithiocarbonate, 33 mg (0.2 mmol) AIBN, 1.3 mL (9.67 mmol) of allyl methacrylate, and 20 mL of THF added to a 50 mL schlenk flask and bubbled with argon for 30 minutes. The flask was placed in an oil bath equilibrated at 50° C. and the reaction proceeded for 2 hours. In a separate flask, 10 mL (97 mmol) of DMA and 10 mL of THF was added and bubbled with argon for 30 minutes. At the 2 hour time point, a small aliquot of polymer was pulled from the schlenk flask and precipitated into heptane. Next, the DMA/THF mixture was added to the schlenk flask, and the reaction proceeded for an additional 18 hours. The polymer was precipitated into heptane and dried in vacuum. Both the isolated polymer (poly (allyl methacrylate)) at 2 hours and that isolated at the end of the reaction (poly(allyl methacrylate-co-dimethylacrylamide)) were characterized by GPC and NMR analysis. GPC showed Mn=3300 for poly(allyl methacrylate) and Mn=6,300 for poly(allyl methacrylate-co-dimethylacrylamide). The NMR showed a ratio of Allyl-MA:DMA as 1:13 which is in agreement with the 10:110 feed ratio of the reaction. The reaction is shown below in Scheme XVII.

SCHEME XVII

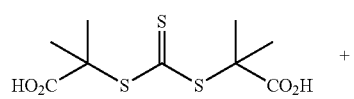
+

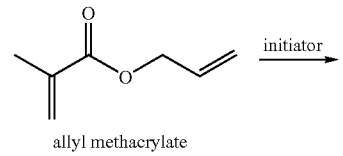
allyl methacrylate

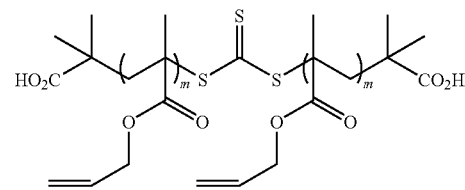

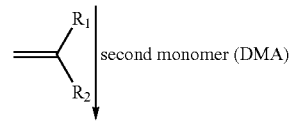
second monomer (DMA)

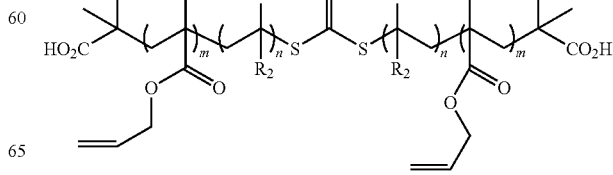

Example 18

Preparation of Allyl Functionalized PDMA 353 mg (0.858 mmol) α-dodecyl,α'-dimethyl-α"-acetic acid) trithiocarbonate (DTTC), 33 mg (0.2 mmol) AIBN, 1.3 mL (9.67 mmol) of allyl methacrylate, and 20 mL of THF were added to a 50 mL schlenk flask and bubbled with argon for 30 minutes. The flask was placed in an oil bath equilibrated at 50° C. and the reaction proceeded for 2 hours. In a separate flask, 10 mL (97 mmol) of DMA and 10 mL of THF were added and bubbled with argon for 30 minutes. At the 2 hour time point, a small aliquot of polymer was pulled from the schlenk flask and precipitated into heptane. Next, the DMA/THF mixture was pulled to the schlenk flask, and the reaction proceeded for an additional 18 hours. The polymer was precipitated into heptane and dried in vacuum. Both the polymer isolated at 2 hours (poly(allyl methacrylate)) and that isolated at the end of the reaction (poly(allyl methacrylate-co-dimethylacrylamide)) were characterized by GPC and NMR analysis. GPC showed Mn=3500 for poly(allyl methacrylate) and Mn=4,100 for poly(allyl methacrylate-co-dimethylacrylamide). The NMR showed a ratio of Allyl-MA:DMA as 1:16 which is in agreement with the 10:110 feed ratio of the reaction. The reaction is shown below in Scheme XVIII.

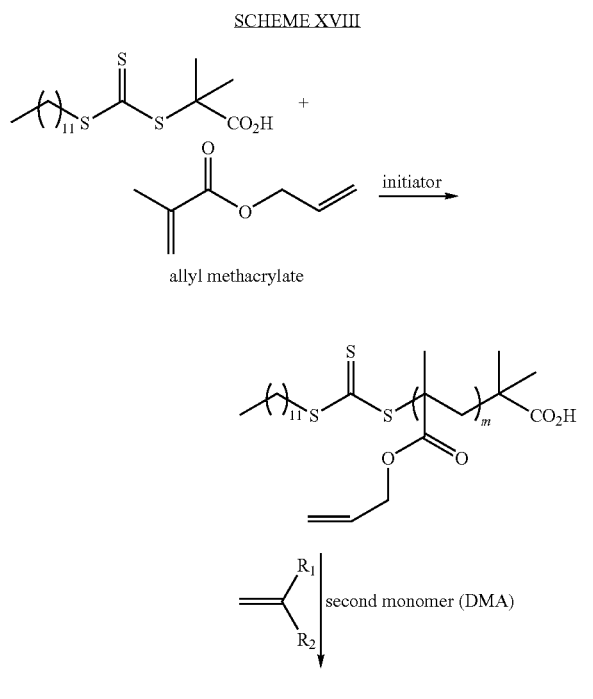

SCHEME XVIII allyl methacrylate second monomer (DMA)

wherein $R_1$ and $R_2$ are the same as described in Scheme XIV.

Example 19

Preparation of a Contact Lens

A mixture is made by mixing the following components listed in Table 1, at amounts per weight percent.

TABLE 1

| Ingredient | Weight Percent |
| --- | --- |
| Polyurethane-siloxane prepolymer | 53 |
| TRIS | 15 |
| NVP | 33 |
| HEMA | 5 |
| HEMAVC | 1 |
| Allyl Functionalized PDMA of Example 17 | 1 |
| N-hexanol | 15 |
| Vazo-64 | 0.5 |
| IMVT | 150 ppm |

The resulting mixture is cast into contact lenses by introducing the mixture to a mold assembly composed of an ethyl vinyl alcohol mold for the anterior surface and an ethyl vinyl alcohol mold for the posterior surface and thermally curing the mixture at 100° C. for 2 hours. The resulting contact lens is released from the mold, extracted with isopropyl alcohol for 4 hours and placed in buffer solution.

Example 20

Preparation of a Contact Lens

A mixture is made by mixing the following components listed in Table 2, at amounts per weight percent.

TABLE 2

| Ingredient | Weight Percent |
| --- | --- |
| Polyurethane-siloxane prepolymer | 53 |
| TRIS | 15 |
| NVP | 33 |
| HEMA | 5 |
| HEMAVC | 1 |
| Allyl Functionalized PDMA of Example 18 | 1 |
| N-hexanol | 15 |
| Vazo-64 | 0.5 |
| IMVT | 150 ppm |

The resulting mixture is cast into contact lenses by introducing the mixture to a mold assembly composed of an ethyl vinyl alcohol mold for the anterior surface and an ethyl vinyl alcohol mold for the posterior surface and thermally curing the mixture at 100° C. for 2 hours. The resulting contact lens is released from the mold, extracted with isopropyl alcohol for 4 hours and placed in buffer solution.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A biomedical device which is a polymerization product of a mixture comprising an ethylenically unsaturated-containing non-amphiphilic macromonomer reversible addition fragmentation chain transfer agent and a biomedical device-forming comonomer.

2. The biomedical device of claim 1, wherein the ethylenically unsaturated moiety of the ethylenically unsaturated-containing non-amphiphilic macromonomer reversible addition fragmentation chain transfer agent is selected from the group consisting of (meth)acrylate, (meth)acrylamide, styrenyl, alkenyl, vinyl carbonate, vinyl carbamate groups and combinations thereof.

3. The biomedical device of claim 1, wherein the ethylenically unsaturated moiety of the ethylenically unsaturated-containing non-amphiphilic macromonomer reversible addition fragmentation chain transfer agent is represented by the general formula:

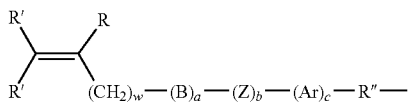

wherein R is hydrogen or a alkyl group having 1 to 6 carbon atoms; each R' is independently hydrogen, an alkyl radical having 1 to 6 carbon atoms, or a —CO—Y—R''' radical wherein Y is —O—, —S— or —NH— and R''' an alkyl radical having 1 to about 10 carbon atoms; R'' is a linking group; B denotes —O— or —NH—; Z denotes —CO—, —OCO— or —COO—; Ar denotes an aromatic radical having 6 to about 30 carbon atoms; w is 0 to 6; a is 0 or 1; b is 0 or 1; and c is 0 or 1.

4. The biomedical device of claim 1, wherein the ethylenically unsaturated-containing non-amphiphilic macromonomer reversible addition fragmentation chain transfer agent comprises hydrophilic units derived from a hydrophilic monomer selected from the group consisting of an unsaturated carboxylic acid, acrylamide, vinyl lactam, ethylenically unsaturated poly(alkylene oxide), (meth)acrylic acid, hydroxyl-containing-(meth)acrylate, hydrophilic vinyl carbonate, hydrophilic vinyl carbamate monomer, hydrophilic oxazolone monomer, and mixtures thereof.

5. The biomedical device of claim 1, wherein the ethylenically unsaturated-containing non-amphiphilic macromonomer reversible addition fragmentation chain transfer agent comprises hydrophilic units derived from a hydrophilic monomer selected from the group consisting of methacrylic acid, acrylic acid, 2-hydroxyethylmethacrylate, 2-hydroxyethylacrylate, N-vinyl pyrrolidone, N-vinyl caprolactone, methacrylamide, N,N-dimethylacrylamide, ethylene glycol dimethacrylate and mixtures thereof.

6. The biomedical device of claim 1, wherein the ethylenically unsaturated-containing non-amphiphilic macromonomer reversible addition fragmentation chain transfer agent comprises hydrophilic units derived from an ethylenically unsaturated polymerizable alkoxylated polymer selected from the group consisting of polyethylene glycol (PEG)-200 methacrylate, PEG-400 methacrylate, PEG-600 methacrylate, PEG-1000 methacrylate and mixtures thereof.

7. The biomedical device of claim 1, wherein the ethylenically unsaturated-containing non-amphiphilic macromonomer reversible addition fragmentation chain transfer agent comprises at least two of the same or different hydrophilic units.

8. The biomedical device of claim 7, wherein the hydrophilic units comprises one or more of polyoxyalkylenes, polyacrylamides, polyvinylpyrrolidones, polyvinyl alcohols, and poly(hydroxyethyl methacrylate).

9. The biomedical device of claim 1, wherein the ethylenically unsaturated-containing non-amphiphilic macromonomer reversible addition fragmentation chain transfer agent comprises hydrophobic units derived from a hydrophobic monomer selected from the groups consisting of an ethylenically unsaturated polymerizable fluorine-containing monomer, ethylenically unsaturated polymerizable fatty acid ester-containing monomer, ethylenically unsaturated polymerizable polysiloxanylalkyl-containing monomer, ethylenically unsaturated polymerizable monomer having ring-opening reactive functionalities, and mixtures thereof.

10. The biomedical device of claim 1, wherein the ethylenically unsaturated-containing non-amphiphilic macromonomer reversible addition fragmentation chain transfer agent comprises hydrophobic units derived from a hydrophobic monomer selected from the group consisting of alkyl (meth)acrylates, N-alkyl (meth)acrylamides, alkyl vinylcarbonates, alkyl vinylcarbamates, fluoroalkyl (meth)acrylates, N-fluoroalkyl (meth)acrylamides, N-fluoroalkyl vinylcarbonates, N-fluoroalkyl vinylcarbamates, silicone-containing (meth)acrylates, (meth)acrylamides, vinyl carbonates, vinyl carbamates, vinyl esters, styrenic monomers, polyoxypropylene (meth)acrylates and mixtures thereof.

11. The biomedical device of claim 1, wherein the reversible addition fragmentation chain transfer agent comprises a dithioester group, xanthate group, dithiocarbamate group or trithiocarbonate group.

12. The biomedical device of claim 1, wherein the biomedical device-forming comonomer is a silicone-containing monomer.

13. The biomedical device of claim 1, wherein the biomedical device-forming comonomer is selected from the group consisting of an unsaturated carboxylic acid, acrylamide, vinyl lactam, poly(alkyleneoxy)(meth)acrylate, (meth)acrylic acid, hydroxyl-containing-(meth)acrylate, hydrophilic vinyl carbonate, hydrophilic vinyl carbamate monomer, hydrophilic oxazolone monomer and mixtures thereof.

14. The biomedical device of claim 1, wherein the biomedical device-forming comonomer is selected from the group consisting of methacrylic acid, acrylic acid, 2-hydroxyethylmethacrylate, 2-hydroxyethylacrylate, N-vinyl pyrrolidone, N-vinyl caprolactone, methacrylamide, N,N-dimethylacrylamide, ethylene glycol dimethacrylate and mixtures thereof.

15. The biomedical device of claim 1, wherein the device is a contact lens.

16. The biomedical device of claim 15, wherein the contact lens is a rigid gas permeable contact lens.

17. The biomedical device of claim 15, wherein the contact lens is a soft contact lens.

18. The biomedical device of claim 15, wherein the contact lens is a hydrogel contact lens.

19. The biomedical device of claim 1, wherein the device is an intraocular lens.

20. The biomedical device of claim 1, wherein the device is a corneal implant.

* * * * *